(12) United States Patent
Gardiner et al.

(10) Patent No.: US 10,229,408 B2
(45) Date of Patent: *Mar. 12, 2019

(54) SYSTEM AND METHOD FOR SELECTIVELY INITIATING BIOMETRIC AUTHENTICATION FOR ENHANCED SECURITY OF ACCESS CONTROL TRANSACTIONS

(71) Applicant: Tactilis Sdn Bhd, Mont Kiara, Kuala Lumpur (MY)

(72) Inventors: Michael Gardiner, Kuala Lumpur (MY); Adriano Canzi, Los Angeles, CA (US)

(73) Assignee: TACTILIS PTE. LIMITED, Singapore (SG)

( * ) Notice: Subject to any disclaimer, the term of this patent is extended or adjusted under 35 U.S.C. 154(b) by 0 days.

This patent is subject to a terminal disclaimer.

(21) Appl. No.: 14/664,573

(22) Filed: Mar. 20, 2015

(65) Prior Publication Data

US 2016/0277396 A1 Sep. 22, 2016

(51) Int. Cl.
*G06Q 20/40* (2012.01)
*G06K 9/00* (2006.01)
(Continued)

(52) U.S. Cl.
CPC ......... *G06Q 20/40* (2013.01); *G06K 9/00087* (2013.01); *G06K 9/00979* (2013.01); *G06Q 20/341* (2013.01); *G06Q 20/409* (2013.01); *G06Q 20/4093* (2013.01); *G06Q 20/40145* (2013.01); *H04L 63/0853* (2013.01); *H04L 63/0861* (2013.01)

(58) Field of Classification Search
CPC .. G06F 21/316; G06Q 20/4014; G06Q 20/40; G06Q 20/3224
See application file for complete search history.

(56) References Cited

U.S. PATENT DOCUMENTS

| 4,453,074 A | 6/1984 | Weinstein et al. |
| 4,582,985 A | 4/1986 | Loefberg |

(Continued)

FOREIGN PATENT DOCUMENTS

| AU | 200238203 C | 11/2002 |
| AU | 757159 B2 | 2/2003 |

(Continued)

OTHER PUBLICATIONS

Kadambi et al "Near-Field Communication-Based Secure Mobile Payment" Aug. 12-15, 2009, ICEE'09, ACM 978-1-60558-586-Apr. 9, 2008,Taipei, Taiwan. pp. 142-151.*

(Continued)

*Primary Examiner* — Harunur Rashid
(74) *Attorney, Agent, or Firm* — Sheppard Mullin Richter & Hampton LLP

(57) ABSTRACT

A method and system of selectively initiating biometric security based on thresholds is described. The method includes retrieving an access security level associated with an access domain and an access permission level associated with an electronic portable transaction device, comparing the access security level and access permission level, and, if the access security level exceeds the access permission level, initiating a biometric authentication process.

11 Claims, 12 Drawing Sheets

(51) Int. Cl.
*G06Q 20/34* (2012.01)
*H04L 29/06* (2006.01)

(56) References Cited

U.S. PATENT DOCUMENTS

| | | |
|---|---|---|
| 4,725,719 A | 2/1988 | Oncken et al. |
| 4,747,147 A | 5/1988 | Sparrow |
| 4,910,521 A | 3/1990 | Mellon |
| 4,993,068 A | 2/1991 | Piosenka et al. |
| 5,175,416 A | 12/1992 | Mansvelt |
| 5,180,901 A | 1/1993 | Hiramatsu |
| 5,180,902 A | 1/1993 | Schick |
| 5,193,114 A | 3/1993 | Moseley et al. |
| 5,245,329 A | 9/1993 | Gokcebay |
| 5,259,649 A | 11/1993 | Shomron |
| 5,321,751 A | 6/1994 | Ray et al. |
| 5,438,184 A | 8/1995 | Roberts et al. |
| 5,461,217 A | 10/1995 | Claus |
| 5,513,272 A | 4/1996 | Bogosian et al. |
| 5,521,363 A | 5/1996 | Tannenbaum |
| 5,521,966 A | 5/1996 | Friedes |
| 5,534,857 A | 7/1996 | Laing et al. |
| 5,539,825 A | 7/1996 | Akiyama et al. |
| 5,541,985 A | 7/1996 | Ishii |
| 5,559,504 A | 9/1996 | Itsumi et al. |
| 5,559,887 A | 9/1996 | Davis et al. |
| 5,577,121 A | 11/1996 | Davis et al. |
| 5,578,808 A | 11/1996 | Taylor et al. |
| 5,581,630 A | 12/1996 | Bonneau et al. |
| 5,590,038 A | 12/1996 | Pitroda |
| 5,590,197 A | 12/1996 | Chen et al. |
| 5,602,918 A | 2/1997 | Chen |
| 5,604,801 A | 2/1997 | Dolan et al. |
| 5,613,001 A | 3/1997 | Bakhoum |
| 5,677,953 A | 10/1997 | Dolphin |
| 5,703,753 A | 12/1997 | Mok |
| 5,721,781 A | 2/1998 | Deo et al. |
| 5,737,439 A | 4/1998 | Lapsley et al. |
| 5,739,512 A | 4/1998 | Tognazzini |
| 5,742,756 A | 4/1998 | Dillaway et al. |
| 5,742,845 A | 4/1998 | Wagner |
| 5,757,917 A | 5/1998 | Rose |
| 5,764,789 A | 6/1998 | Pare, Jr. et al. |
| 5,778,173 A | 7/1998 | Apte |
| 5,796,831 A | 8/1998 | Paradinas et al. |
| 5,799,087 A | 8/1998 | Rosen |
| 5,806,045 A | 9/1998 | Biorge et al. |
| 5,815,252 A | 9/1998 | Price et al. |
| 5,815,657 A | 9/1998 | Williams et al. |
| 5,826,241 A | 10/1998 | Stein et al. |
| 5,826,243 A | 10/1998 | Musmanno |
| 5,835,894 A | 11/1998 | Adcock et al. |
| 5,838,818 A | 11/1998 | Herley et al. |
| 5,857,079 A | 1/1999 | Claus |
| 5,869,822 A | 2/1999 | Meadows et al. |
| 5,875,432 A | 2/1999 | Sehr |
| 5,884,271 A | 3/1999 | Pitroda |
| 5,884,292 A | 3/1999 | Baker et al. |
| 5,889,941 A | 3/1999 | Tushie |
| 5,892,211 A | 4/1999 | Davis et al. |
| 5,898,838 A | 4/1999 | Wagner |
| 5,901,239 A | 5/1999 | Kamei |
| 5,905,908 A | 5/1999 | Wagner |
| 5,907,620 A | 5/1999 | Klemba et al. |
| 5,912,446 A | 6/1999 | Wong |
| 5,915,973 A | 6/1999 | Hoehn et al. |
| 5,917,913 A | 6/1999 | Wang et al. |
| 5,917,925 A | 6/1999 | Moore et al. |
| 5,920,058 A | 7/1999 | Weber et al. |
| 5,920,629 A | 7/1999 | Rosen |
| 5,920,847 A | 7/1999 | Kolling et al. |
| 5,930,767 A | 7/1999 | Reber et al. |
| 5,931,917 A | 8/1999 | Nguyen |
| 5,936,226 A | 8/1999 | Aucsmith |
| 5,942,761 A | 8/1999 | Tuli |
| 5,978,495 A | 11/1999 | Thomopoulos |
| 5,987,155 A | 11/1999 | Dunn et al. |
| 5,988,497 A | 11/1999 | Wallace et al. |
| 5,991,411 A | 11/1999 | Kaufman |
| 5,995,014 A | 11/1999 | DiMaria |
| 6,012,039 A | 1/2000 | Hoffman et al. |
| 6,012,636 A | 1/2000 | Smith et al. |
| 6,016,476 A | 1/2000 | Maes et al. |
| 6,018,739 A | 1/2000 | McCoy et al. |
| 6,041,410 A | 3/2000 | Shi et al. |
| 6,045,956 A | 4/2000 | Kato |
| 6,047,281 A | 4/2000 | Wilson et al. |
| 6,047,282 A | 4/2000 | Wilson |
| 6,060,815 A | 5/2000 | Nysen |
| 6,070,159 A | 5/2000 | Wilson |
| 6,091,835 A | 7/2000 | Smithies et al. |
| 6,095,413 A | 8/2000 | Tetro et al. |
| 6,095,519 A | 8/2000 | Shoemaker, Jr. |
| 6,101,477 A | 8/2000 | Hohle et al. |
| 6,104,311 A | 8/2000 | Lastinger |
| 6,104,922 A | 8/2000 | Baumann et al. |
| 6,116,736 A | 9/2000 | Stark et al. |
| 6,120,461 A | 9/2000 | Smyth |
| 6,130,623 A | 10/2000 | MacLellan et al. |
| 6,148,093 A | 11/2000 | McConnell et al. |
| 6,154,879 A | 11/2000 | Pare, Jr. et al. |
| 6,175,656 B1 | 1/2001 | Hoang |
| 6,182,892 B1 | 2/2001 | Angelo et al. |
| 6,199,079 B1 | 3/2001 | Gupta et al. |
| 6,199,762 B1 | 3/2001 | Hohle |
| 6,219,639 B1 | 4/2001 | Bakis et al. |
| 6,223,984 B1 | 5/2001 | Renner et al. |
| 6,233,348 B1 | 5/2001 | Fujii et al. |
| 6,256,690 B1 | 7/2001 | Carper |
| 6,257,486 B1 | 7/2001 | Teicher et al. |
| 6,257,620 B1 | 7/2001 | Kenney |
| 6,263,446 B1 | 7/2001 | Kausik et al. |
| 6,265,977 B1 | 7/2001 | Vega et al. |
| 6,268,788 B1 | 7/2001 | Gray |
| 6,269,348 B1 | 7/2001 | Pare, Jr. et al. |
| 6,270,011 B1 | 8/2001 | Gottfried |
| 6,272,562 B1 | 8/2001 | Scott et al. |
| 6,275,353 B1 | 8/2001 | Briggs |
| 6,282,649 B1 * | 8/2001 | Lambert ............. G06F 21/6218 380/277 |
| 6,298,146 B1 | 10/2001 | Ilan et al. |
| 6,307,956 B1 | 10/2001 | Black |
| 6,325,285 B1 | 12/2001 | Baratelli |
| 6,327,578 B1 | 12/2001 | Linehan |
| 6,332,193 B1 | 12/2001 | Glass et al. |
| 6,338,048 B1 | 1/2002 | Mori |
| 6,338,435 B1 | 1/2002 | Carper |
| 6,345,761 B1 | 2/2002 | Seelbach et al. |
| 6,357,663 B1 | 3/2002 | Takahashi et al. |
| 6,360,953 B1 | 3/2002 | Lin et al. |
| 6,390,374 B1 | 5/2002 | Carper et al. |
| 6,424,249 B1 | 7/2002 | Houvener |
| 6,442,286 B1 | 8/2002 | Kramer |
| 6,446,862 B1 | 9/2002 | Mann |
| 6,480,825 B1 | 11/2002 | Sharma et al. |
| 6,480,935 B1 | 11/2002 | Carper et al. |
| 6,483,929 B1 | 11/2002 | Murakami et al. |
| 6,483,932 B1 | 11/2002 | Martinez et al. |
| 6,490,443 B1 | 12/2002 | Freeny, Jr. |
| 6,496,594 B1 | 12/2002 | Prokoski |
| 6,507,662 B1 | 1/2003 | Brooks |
| 6,519,565 B1 | 2/2003 | Clements et al. |
| 6,539,101 B1 | 3/2003 | Black |
| 6,560,581 B1 | 5/2003 | Fox et al. |
| 6,588,660 B1 | 7/2003 | Buescher et al. |
| 6,588,673 B1 | 7/2003 | Chan et al. |
| 6,591,249 B2 | 7/2003 | Zoka |
| 6,601,759 B2 | 8/2003 | Fife et al. |
| 6,601,762 B2 | 8/2003 | Piotrowski |
| 6,609,656 B1 | 8/2003 | Elledge |
| 6,615,191 B1 | 9/2003 | Seeley |
| 6,628,813 B2 | 9/2003 | Scott et al. |
| 6,629,591 B1 | 10/2003 | Griswold et al. |
| 6,631,201 B1 | 10/2003 | Dickinson et al. |

(56) References Cited

U.S. PATENT DOCUMENTS

| | | | |
|---|---|---|---|
| 6,636,620 B1 | 10/2003 | Hoshino | |
| 6,655,585 B2 | 12/2003 | Shinn | |
| 6,657,614 B1 | 12/2003 | Ito et al. | |
| 6,658,164 B1 | 12/2003 | Irving | |
| 6,662,166 B2 | 12/2003 | Pare, Jr. | |
| 6,669,086 B2 | 12/2003 | Abdi et al. | |
| 6,681,328 B1 | 1/2004 | Harris | |
| 6,687,391 B1 | 2/2004 | Scott et al. | |
| 6,697,947 B1 | 2/2004 | Matyas, Jr. et al. | |
| 6,703,918 B1 | 3/2004 | Kita | |
| 6,719,200 B1 | 4/2004 | Wiebe | |
| 6,732,919 B2 | 5/2004 | Macklin et al. | |
| 6,734,887 B2 | 5/2004 | Field | |
| 6,744,909 B1 | 6/2004 | Kostrzewski et al. | |
| 6,744,910 B1 | 6/2004 | McClurg et al. | |
| 6,765,470 B2 | 7/2004 | Shinzaki | |
| 6,776,332 B2 | 8/2004 | Allen et al. | |
| 6,799,726 B2 | 10/2004 | Stockhammer | |
| 6,816,058 B2 | 11/2004 | McGregor et al. | |
| 6,819,219 B1 * | 11/2004 | Bolle | G06F 21/32 340/5.52 |
| 6,826,000 B2 | 11/2004 | Lee et al. | |
| 6,828,299 B2 | 12/2004 | Yang et al. | |
| 6,828,960 B2 | 12/2004 | Parry | |
| 6,834,795 B1 | 12/2004 | Rasmussen et al. | |
| 6,867,850 B2 | 3/2005 | McClurg | |
| 6,870,946 B1 | 3/2005 | Teng | |
| 6,873,974 B1 | 3/2005 | Schutzer | |
| 6,877,097 B2 | 4/2005 | Hamid et al. | |
| 6,886,104 B1 | 4/2005 | McClurg et al. | |
| 6,892,940 B2 | 5/2005 | Kocarev | |
| 6,901,154 B2 | 5/2005 | Dunn | |
| 6,914,517 B2 | 7/2005 | Kinsella | |
| 6,917,695 B2 | 7/2005 | Teng et al. | |
| 6,925,439 B1 | 8/2005 | Pitroda | |
| 6,925,565 B2 | 8/2005 | Black | |
| 6,928,181 B2 | 8/2005 | Brooks | |
| 6,928,195 B2 | 8/2005 | Scott et al. | |
| 6,929,413 B2 | 8/2005 | Schofield | |
| 6,931,538 B1 | 8/2005 | Sawaguchi | |
| 6,934,861 B2 | 8/2005 | Haala | |
| 6,944,768 B2 | 9/2005 | Siegel et al. | |
| 6,954,260 B2 | 10/2005 | Arnold et al. | |
| 6,968,453 B2 | 11/2005 | Doyle et al. | |
| 6,970,582 B2 | 11/2005 | Langley | |
| 6,971,031 B2 | 11/2005 | Haala | |
| 6,983,062 B2 | 1/2006 | Smith | |
| 6,988,665 B2 | 1/2006 | Schofield | |
| 6,996,259 B2 | 2/2006 | Cannon et al. | |
| 6,997,381 B2 | 2/2006 | Arnouse | |
| 7,010,148 B2 | 3/2006 | Irving | |
| 7,028,893 B2 | 4/2006 | Goodman et al. | |
| 7,049,962 B2 | 5/2006 | Atherton et al. | |
| 7,051,925 B2 | 5/2006 | Schwarz, Jr. | |
| 7,059,159 B2 | 6/2006 | Lanigan et al. | |
| 7,059,531 B2 | 6/2006 | Beenau et al. | |
| 7,068,822 B2 | 6/2006 | Scott | |
| 7,073,711 B2 | 7/2006 | Fernandez et al. | |
| 7,079,007 B2 | 7/2006 | Siegel et al. | |
| 7,095,880 B2 | 8/2006 | Martinez | |
| 7,102,523 B2 | 9/2006 | Shanks et al. | |
| 7,103,201 B2 | 9/2006 | Scott et al. | |
| 7,127,088 B1 | 10/2006 | Grajewski et al. | |
| 7,132,946 B2 | 11/2006 | Waldner et al. | |
| 7,155,039 B1 | 12/2006 | Lo | |
| 7,162,060 B1 | 1/2007 | Barton et al. | |
| 7,164,440 B2 | 1/2007 | Cannon | |
| 7,165,716 B1 | 1/2007 | Modl et al. | |
| 7,171,662 B1 | 1/2007 | Misra et al. | |
| 7,181,017 B1 | 2/2007 | Nagel et al. | |
| 7,203,344 B2 | 4/2007 | McClurg et al. | |
| 7,218,202 B2 | 5/2007 | Bacchiaz et al. | |
| 7,239,227 B1 | 7/2007 | Gupta et al. | |
| 7,266,848 B2 | 9/2007 | Moyer et al. | |
| 7,271,881 B2 | 9/2007 | Arnold et al. | |
| 7,278,025 B2 | 10/2007 | Saito et al. | |
| 7,289,649 B1 | 10/2007 | Walley et al. | |
| 7,303,120 B2 | 12/2007 | Beenau et al. | |
| 7,305,563 B2 | 12/2007 | Bacchiaz et al. | |
| 7,308,122 B2 | 12/2007 | McClurg et al. | |
| 7,314,164 B2 | 1/2008 | Bonalle et al. | |
| 7,314,165 B2 | 1/2008 | Bonalle | |
| 7,319,565 B2 | 1/2008 | Arnold et al. | |
| 7,325,724 B2 | 2/2008 | Bonalle et al. | |
| 7,364,071 B2 | 4/2008 | Esplin | |
| 7,466,348 B2 | 12/2008 | Morikawa et al. | |
| 7,506,172 B2 | 3/2009 | Bhakta | |
| 7,543,337 B2 | 6/2009 | D'Agnolo | |
| 7,724,137 B2 | 5/2010 | Page | |
| 7,730,526 B2 | 6/2010 | Lamplough | |
| 7,751,593 B2 | 7/2010 | Hombo | |
| 7,938,329 B2 | 5/2011 | Tran | |
| 7,946,501 B2 | 5/2011 | Borracci | |
| 7,992,789 B2 | 8/2011 | Borracci | |
| 8,045,956 B2 * | 10/2011 | Sun et al. | 455/406 |
| 8,095,519 B2 | 1/2012 | Delia | |
| 8,186,580 B2 | 5/2012 | Cannon et al. | |
| 8,253,531 B2 | 8/2012 | Davis et al. | |
| 8,276,816 B2 | 10/2012 | Gardner | |
| 8,307,207 B2 | 11/2012 | Bacchiaz et al. | |
| 8,360,322 B2 | 1/2013 | Bonalle et al. | |
| 8,485,442 B2 | 7/2013 | McNeal | |
| 8,490,872 B2 | 7/2013 | Kim | |
| 8,499,164 B2 | 7/2013 | Ortiz et al. | |
| 8,553,251 B2 | 10/2013 | Iizuka | |
| 8,572,395 B2 | 10/2013 | Ito | |
| 8,598,981 B2 | 12/2013 | Idsøe et al. | |
| 8,607,063 B2 | 12/2013 | Ikeuchi | |
| 8,708,230 B2 | 4/2014 | Cannon et al. | |
| 8,713,660 B2 | 4/2014 | Carper | |
| 8,756,680 B2 | 6/2014 | Shashidhar | |
| 8,782,427 B2 | 7/2014 | Fedronic et al. | |
| 8,783,578 B2 | 7/2014 | Kim | |
| 8,786,033 B2 | 7/2014 | Saito | |
| 8,799,167 B2 | 8/2014 | Carper | |
| 9,697,388 B1 | 7/2017 | Jacobson | |
| 2001/0049785 A1 | 12/2001 | Kawan | |
| 2002/0059523 A1 | 5/2002 | Bacchiaz et al. | |
| 2002/0095587 A1 | 7/2002 | Doyle et al. | |
| 2002/0153424 A1 | 10/2002 | Li | |
| 2003/0046554 A1 | 3/2003 | Leydier | |
| 2003/0159044 A1 | 8/2003 | Doyle | |
| 2004/0039909 A1 * | 2/2004 | Cheng | G06F 21/32 713/169 |
| 2004/0129787 A1 | 7/2004 | Saito et al. | |
| 2004/0188519 A1 | 9/2004 | Cassone | |
| 2004/0266267 A1 | 12/2004 | Inaba | |
| 2005/0035200 A1 | 2/2005 | Hendrick | |
| 2005/0125674 A1 | 6/2005 | Nishiki et al. | |
| 2005/0139685 A1 | 6/2005 | Kozlay | |
| 2005/0144354 A1 | 6/2005 | Murashita | |
| 2005/0182947 A1 | 8/2005 | Bacchiaz et al. | |
| 2005/0240778 A1 | 10/2005 | Saito | |
| 2006/0032905 A1 | 2/2006 | Bear | |
| 2006/0070114 A1 * | 3/2006 | Wood | G06F 21/32 726/2 |
| 2006/0113381 A1 | 6/2006 | Hochstein et al. | |
| 2006/0161789 A1 | 7/2006 | Doughty | |
| 2006/0208066 A1 | 9/2006 | Finn | |
| 2007/0033150 A1 | 2/2007 | Nwosu | |
| 2007/0040017 A1 | 2/2007 | Kozlay | |
| 2007/0043594 A1 | 2/2007 | Lavergne | |
| 2007/0073619 A1 | 3/2007 | Smith | |
| 2007/0124536 A1 | 5/2007 | Carper | |
| 2007/0154018 A1 | 7/2007 | Watanabe | |
| 2007/0186106 A1 * | 8/2007 | Ting | H04L 63/0815 713/168 |
| 2007/0194131 A1 | 8/2007 | Brown | |
| 2007/0220273 A1 | 9/2007 | Campisi | |
| 2007/0228154 A1 | 10/2007 | Tran | |
| 2007/0251997 A1 | 11/2007 | Brown | |
| 2008/0005425 A1 | 1/2008 | Saito | |
| 2008/0016370 A1 | 1/2008 | Libin | |
| 2008/0019578 A1 | 1/2008 | Saito et al. | |

(56) References Cited

U.S. PATENT DOCUMENTS

| | | |
|---|---|---|
| 2008/0040615 A1 | 2/2008 | Carper et al. |
| 2008/0054875 A1 | 3/2008 | Saito |
| 2008/0072065 A1 | 3/2008 | Bonalle et al. |
| 2008/0097924 A1 | 4/2008 | Carper et al. |
| 2008/0126260 A1 | 5/2008 | Cox |
| 2008/0148059 A1 | 6/2008 | Shapiro |
| 2008/0164325 A1 | 7/2008 | Borracci |
| 2008/0201658 A1 | 8/2008 | Saito et al. |
| 2008/0223921 A1 | 9/2008 | Salazar |
| 2008/0223925 A1 | 9/2008 | Saito et al. |
| 2008/0230613 A1 | 9/2008 | Leibenguth |
| 2008/0282334 A1 | 11/2008 | Yves |
| 2009/0084858 A1 | 4/2009 | Borracci |
| 2009/0094125 A1 | 4/2009 | Killian |
| 2009/0313493 A1 | 12/2009 | Ide |
| 2009/0322477 A1 | 12/2009 | Celorio |
| 2010/0039234 A1 | 2/2010 | Soliven |
| 2010/0080425 A1 | 4/2010 | Bebis |
| 2010/0148312 A1 | 6/2010 | Jung |
| 2010/0153451 A1* | 6/2010 | Delia et al. ............... 707/781 |
| 2010/0215224 A1 | 8/2010 | Saito |
| 2010/0257359 A1 | 10/2010 | Currie |
| 2010/0260388 A1 | 10/2010 | Garrett |
| 2010/0275259 A1 | 10/2010 | Adams |
| 2011/0238540 A1 | 9/2011 | Carrington |
| 2011/0256832 A1 | 10/2011 | Park |
| 2012/0016798 A1 | 1/2012 | Carper |
| 2012/0022957 A1 | 1/2012 | Sun |
| 2012/0079273 A1 | 3/2012 | Bacchiaz et al. |
| 2012/0120013 A1 | 5/2012 | Kurz |
| 2012/0218079 A1 | 8/2012 | Kim |
| 2012/0241524 A1 | 9/2012 | Blot et al. |
| 2012/0297467 A1 | 11/2012 | Carper |
| 2012/0313754 A1 | 12/2012 | Bona |
| 2013/0026230 A1 | 1/2013 | Cannon et al. |
| 2013/0036463 A1 | 2/2013 | Shashidhar |
| 2013/0056540 A1 | 3/2013 | Blot et al. |
| 2013/0080788 A1 | 3/2013 | Bacchiaz et al. |
| 2013/0290136 A1* | 10/2013 | Sheets ............... G06Q 30/0609 705/26.35 |
| 2014/0006277 A1 | 1/2014 | Rao |
| 2014/0046785 A1 | 2/2014 | Jenkins |
| 2014/0232526 A1 | 8/2014 | Carper |
| 2014/0251997 A1 | 9/2014 | Bitton |
| 2015/0067348 A1 | 3/2015 | Webber |
| 2015/0127553 A1 | 5/2015 | Sundaram |
| 2015/0262170 A1 | 9/2015 | Bouda |
| 2015/0379033 A1 | 12/2015 | Agarwal |
| 2016/0191512 A1* | 6/2016 | Tatourian ............ H04L 63/0861 726/7 |
| 2017/0170513 A1 | 6/2017 | Sakamoto |
| 2017/0323130 A1 | 11/2017 | Dickinson |

FOREIGN PATENT DOCUMENTS

| | | |
|---|---|---|
| AU | 2003274967 A1 | 4/2004 |
| AU | 2004218720 B2 | 11/2004 |
| AU | 784438 B2 | 4/2006 |
| AU | 2006311596 A1 | 5/2007 |
| AU | 2007229728 A1 | 10/2007 |
| AU | 2010224455 A1 | 1/2011 |
| CA | 2346592 A1 | 11/2001 |
| CA | 2498288 A1 | 3/2004 |
| CA | 2564707 A1 | 11/2005 |
| CA | 2629435 A1 | 5/2007 |
| CA | 2748563 A1 | 3/2012 |
| CA | 2844003 A1 | 2/2013 |
| DE | 60111892 T2 | 8/2005 |
| DE | 10393215 T5 | 9/2005 |
| EP | 994439 A2 | 4/2000 |
| EP | 1256908 A1 | 11/2002 |
| EP | 1418486 | 5/2004 |
| EP | 1537526 A0 | 6/2005 |
| EP | 1157906 A2 | 7/2005 |
| EP | 1647942 A2 | 4/2006 |
| EP | 1716660 A0 | 11/2006 |
| EP | 1759337 A0 | 3/2007 |
| EP | 1840788 | 10/2007 |
| EP | 1924976 A0 | 5/2008 |
| EP | 1952244 A0 | 8/2008 |
| EP | 2290625 A1 | 3/2011 |
| EP | 2434462 A1 | 3/2012 |
| EP | 2569735 B1 | 3/2013 |
| FR | 2953619 A1 | 6/2011 |
| FR | 2959847 A1 | 11/2011 |
| GB | 2473283 A | 3/2011 |
| JP | 02-088859 A | 3/1990 |
| JP | 02118790 A | 5/1990 |
| JP | 11039483 A | 2/1999 |
| JP | 2001250064 | 9/2001 |
| JP | 2001323691 A | 11/2001 |
| JP | 2002183706 | 6/2002 |
| JP | 2005242650 | 9/2005 |
| JP | 2005326995 | 11/2005 |
| JP | 2006257871 A | 9/2006 |
| JP | 200748118 A | 2/2007 |
| JP | 2007058649 | 3/2007 |
| JP | 2007156785 | 6/2007 |
| JP | 2007265321 | 10/2007 |
| JP | 2008078820 A | 4/2008 |
| JP | 2010262586 | 11/2010 |
| JP | 2011090686 A | 5/2011 |
| JP | 2012074011 A | 4/2012 |
| JP | 2014134845 | 7/2014 |
| KR | 20030042639 | 6/2003 |
| WO | 97/18653 A1 | 5/1997 |
| WO | 2001016707 A1 | 3/2001 |
| WO | 2001016759 A1 | 3/2001 |
| WO | 2001016865 A1 | 3/2001 |
| WO | 2001016873 A1 | 3/2001 |
| WO | 2001016874 A1 | 3/2001 |
| WO | 2001039427 A1 | 3/2001 |
| WO | 2004025545 A2 | 3/2004 |
| WO | 2005104704 A1 | 11/2005 |
| WO | 2006102625 A2 | 9/2006 |
| WO | 2007022423 A2 | 2/2007 |
| WO | 2007056476 A2 | 5/2007 |
| WO | 2007064429 A1 | 6/2007 |
| WO | 2007143670 A2 | 12/2007 |
| WO | 2007146681 A2 | 12/2007 |
| WO | 2008010899 A2 | 1/2008 |
| WO | 2008079491 A2 | 7/2008 |
| WO | 2010019961 A2 | 2/2010 |
| WO | 2010077999 A2 | 7/2010 |
| WO | 2010133469 | 11/2010 |
| WO | 2010133496 | 11/2010 |
| WO | 2011067543 A1 | 6/2011 |
| WO | 2011141659 A2 | 11/2011 |

OTHER PUBLICATIONS

Jung, Stefan, "A Low-Power and High-Performance CMOS Fingerprint Sensing and Encoding Architecture," IEEE Journal of Solid-State Circuits, Jul. 1999, pp. 978-984, vol. 34, No. 7.

Noore, Afzel, "Highly Robust Biometric Smart Card Design," IEEE Transactions on Consumer Electronics, Nov. 2000, pp. 1059-1063, vol. 46, No. 4.

Sanchez-Reillo, Raul, et al., "Fingerprint Verification Using Smart Cards for Access Control Systems," 2001, pp. 250-253.

Sanchez-Reillo, Raul, et al., "Microprocessor Smart Cards with Fingerprint User Authorization," IEEE AESS Systems Magazine, Mar. 2003, pp. 22-24.

Sung, Bum Pan, et al., "An Ultra-Low Memory Fingerprint Matching Algorithm and Its Implementation on a 32-bit Smart Card," IEEE, Mar. 26, 2003, pp. 453-459.

Kim, Dong-Sun, "On the Design of an Embedded Biometric Smart Card Reader," IEEE, Apr. 16, 2008, pp. 573-577.

Kim, Seong-Jin, "A CMOS Fingerprint System-on-a-Chip With Adaptable Pixel Networks and Column-Parallel Processors for Image Enhancement and Recognition," IEEE Journal of Solid-State Circuits, Nov. 2008, pp. 2558-2567, vol. 43, No. 11.

(56) References Cited

OTHER PUBLICATIONS

Nixon, Jenny, "Reconciling your Quicken Account with the Bank Statement," University of Nebraska, Lincoln, 2005.
"Biometric Technology for Secure Access," Sep. 18, 2007, Biometric Associates, Inc., Baltimore, MD, USA.
Patent Cooperation Treaty, International Search Report for PCT/US2016/000324, dated Oct. 18, 2016, pp. 4-5.
Patent Cooperation Treaty, International Search Report for PCT/IB2016/000026, dated May 17, 2016, pp. 4-5.
Patent Cooperation Treaty, International Search Report for PCT/US2016/000020, dated May 24, 2016, pp. 4-5.
Patent Cooperation Treaty, International Search Report for PCT/IB2016/000048, dated Apr. 15, 2016, p. 5.
ISO 7816 Part 3: Electronic Signals and Transmission Protocols, www.cardwerk.com/smartcards/smartcard_standard_IS07816-3.aspx, Jan. 12, 2015 (11 pages).
John Fenske, "Biometrics Move to Smart Cards and Smartphones for Access Control", John Fenske, Jul. 30, 2013 (4 pages).
Patent Cooperation Treaty, International Preliminary Report on Patentability PCT/IB2016/000020, dated Jul. 18, 2017, p. 4.
Patent Cooperation Treaty, International Preliminary Report on Patentability for PCT/IB2016/000048, dated Apr. 26, 2016, p. 4.
Patent Cooperation Treaty, International Search Report for PCT/IB2016/00093, dated Sep. 5, 2017, p. 7.
Patent Cooperation Treaty, International Preliminary Report on Patentability for PCT/IB2016/000093, dated Sep. 26, 2017, p. 4.
Patent Cooperation Treaty, International Preliminary Report on Patentability for PCT/IB2016/000026, dated Jul. 18, 2017, p. 4.
Patent Cooperation Treaty, International Preliminary Report on Patentability for PCT/IB2016/000324, Sep. 26, 2017, p. 4.
Patent Cooperation Treaty, International Preliminary Report on Patentability for PCT/IB2016/000048, dated Jul. 25, 2017, p. 4.
Patent Cooperation Treaty, International Search Report for PCT/IB2016/00020, dated May 24, 2017, pp. 2-3.
Anonymous: "ISO/IEC 7816-3 Identification cards—Integrated circuit cards—Part 3: Cards with contacts—Electrical interface and transmission protocols", Nov. 1, 2006 (Nov. 1, 2006), XP055438640, Retrieved from the Internet: URL:http://read.pudn.com/downloads132/doc/comm/563504/ISO-IEC 7816/ISO+IEC7816-3-2006.pdf [retrieved on Jan. 8, 2018].

* cited by examiner

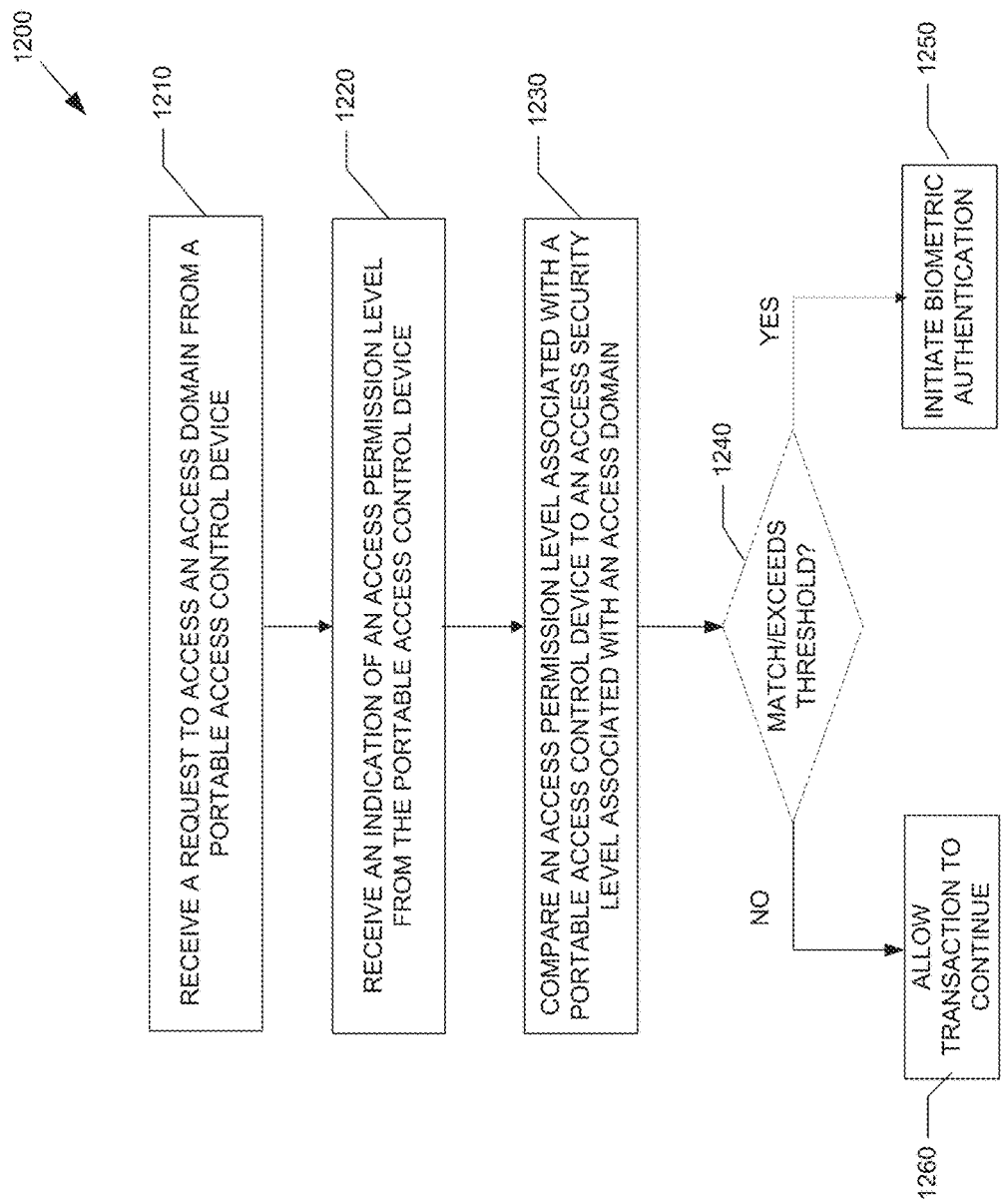

SYSTEM AND METHOD FOR SELECTIVELY INITIATING BIOMETRIC AUTHENTICATION FOR ENHANCED SECURITY OF ACCESS CONTROL TRANSACTIONS

CROSS-REFERENCE TO RELATED APPLICATIONS

The present application is related to co-pending U.S. patent application Ser. No. 14/596,508, filed Jan. 14, 2015, entitled "System and Method for Requesting Reconciliation of Electronic Transaction Records for Enhanced Security"; U.S. patent application Ser. No. 14/596,472, filed Jan. 14, 2015, entitled "System and Method for Comparing Electronic Transaction Records for Enhanced Security"; U.S. patent application Ser. No. 14/596,420, filed Jan. 14, 2015, entitled "System and Method for Reconciling Electronic Transaction Records for Enhanced Security"; U.S. patent application Ser. No. 14/596,572, filed Jan. 14, 2015, entitled "Smart Card Systems Comprising a Card and a Carrier"; U.S. patent application Ser. No. 14/603,703, filed Jan. 23, 2015, entitled "Biometric Device Utilizing Finger Sequence for Authentication"; U.S. patent application Ser. No. 14/616,069 filed Feb. 6, 2015, entitled "Smart Card Systems and Methods Utilizing Multiple ATR Messages"; and U.S. patent application Ser. No. 14/664,429 filed Mar. 20, 2015, entitled "System and Method for Selectively Initiating Biometric Authentication for Enhanced Security of Financial Transactions," which are all incorporated herein by reference in their entirety.

FIELD OF THE INVENTION

The present invention relates to electronic transactions. More specifically, the present invention relates to system and method for selectively initiating biometric authentication for enhanced security of electronic transactions.

BACKGROUND

Electronic transactions—such as for payments or access to a facility or computer—can be conducted using electronic portable transaction devices, such as smart cards or mobile devices. A smart card is a device that includes an embedded integrated circuit chip that can be either a secure processing module (e.g., microprocessor, microcontroller or equivalent intelligence) operating with an internal or external memory or a memory chip alone. Smart cards can provide identification, authentication, data storage, and application processing. Smart cards can serve as credit or ATM debit cards, phone or fuel cards, and high-security access-control cards for granting access to a computer or a physical facility. Smart cards can authenticate identity of the user by employing a token, such as public key infrastructure (PKI) and one-time-password (OTP). In addition, smart cards can be configured for a biometric authentication to provide an additional layer of security.

Similarly, mobile devices such as smartphones, PDAs, tablets, and laptops can provide a platform for electronic transactions. For example, a user of a mobile device can conduct an electronic transaction for purchase of a product or service using an application that communicates with a mobile payment service. Mobile devices can be configured for a token-based authentication and/or a biometric authentication.

Additional layers of security, however, may not always be necessary, or desired. For example, biometric authentication may not need to occur for low-value or routine transactions, such as purchases below a certain amount. What is needed is a method of enhanced security that may be selectively applied based on the nature of the transaction.

BRIEF SUMMARY OF THE INVENTION

Various embodiments of the present disclosure are directed to selectively enhancing security of electronic transactions through the use of authentication thresholds.

In accordance with the technology described herein, a method of selectively initiating biometric authentication in an access control system comprises comparing an access permission level associated with a portable access control device to an access security level associated with an access domain; and initiating a biometric authentication process if the access security level associated with the access domain is higher than the access permission level associated with the electronic portable transaction device.

In accordance with the technology described herein, a portable access control device comprises a processing module configured to execute a program configured to: receive an indication of an access security level associated with an access domain from a fixed access control device associated with the access domain, and initiate a biometric authentication process if the access security level associated with the access domain is higher than an access permission level associated with the portable access control device; and a memory configured to store the program.

In accordance with the technology described herein, a fixed access control device comprises a processing module configured to execute a program configured to: receive an indication of an access permission level associated with a portable access control device, and initiate a biometric authentication process if the access permission level associated with the portable transaction device is higher than an access security level associated with an access domain; and a memory configured to store the program.

Other features and aspects of the disclosed technology will become apparent from the following detailed description, taken in conjunction with the accompanying drawings, which illustrate, by way of example, the features in accordance with embodiments of the disclosed technology. The summary is not intended to limit the scope of any inventions described herein, which are defined solely by the claims attached hereto.

BRIEF DESCRIPTION OF SEVERAL VIEWS OF THE DRAWINGS

The technology disclosed herein, in accordance with one or more various embodiments, is described in detail with reference to the following figures. The drawings are provided for purposes of illustration only and merely depict typical or example embodiments of the disclosed technology. These drawings are provided to facilitate the reader's understanding of the disclosed technology and shall not be considered limiting of the breadth, scope, or applicability thereof. It should be noted that for clarity and ease of illustration these drawings are not necessarily made to scale.

FIG. 12 is a flowchart illustrating an example of biometric security utilizing threshold implemented in a portable access control device according to certain aspects of the present disclosure.

DETAILED DESCRIPTION

The present disclosure addresses this and other problems associated with enhanced layers of security for electronic transactions by providing a procedure for selectively initiating biometric authentication of an electronic portable transaction device. In certain aspects of the present disclosure, the selective initiation of biometric authentication can be based on thresholds associated with the need for biometric authentication (hereinafter "threshold-based authentication procedure"). For financial transactions, biometric authentication can be initiated based on a comparison between a transaction amount of a transaction involving an electronic portable transaction device and a threshold amount associated with the user's account. For access control transactions, biometric authentication can be initiated based on a comparison between an access security level associated with an access domain and an access permission level associated with an electronic portable transaction device.

In the following detailed description, numerous specific details are set forth to provide a full understanding of various aspects of the subject disclosure. It will be apparent, however, to one ordinarily skilled in the art that various aspects of the subject disclosure may be practiced without some of these specific details. In other instances, well-known structures and techniques have not been shown in detail to avoid unnecessarily obscuring the subject disclosure.

Figure 1:
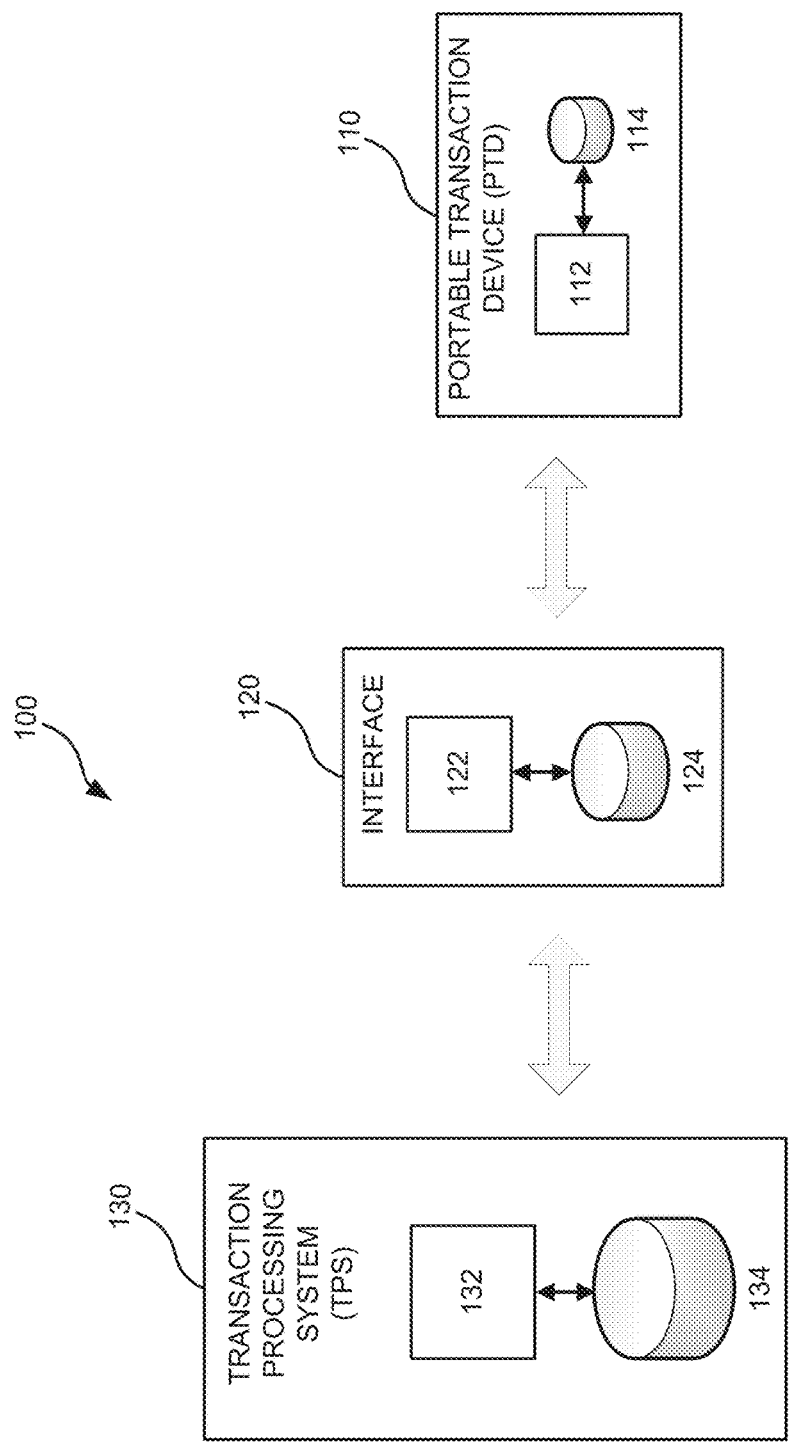
FIG. 1 is a block diagram of an example electronic transaction system within which various embodiments of the technology disclosed herein may be implemented.

FIG. 1 is a block diagram of an example electronic transaction system 100 that can implement a threshold-based authentication procedure according to certain aspects of the present disclosure. The system 100 includes an electronic portable transaction device (PTD) 110, a transaction processing system (TPS) 130, and an interface device 120 that facilitates communications between the PTD 110 and the TPS 130. The PTD 110 can be, for example, a smart card, a smart key, a smart fob, or a mobile device. In some embodiments, the PTD 110 can include a biometric authentication module (not shown) for biometric authentication.

The PTD 110 can conduct various types of electronic transactions with the TPS 130 via the interface device 120. For financial transaction applications, the PTD 110 can be a smart payment card such as a smart credit, debit, and/or prepaid card, or a smartphone with a payment transaction application. The TPS 130 can be a payment processing system of a merchant (e.g., Target®), a bank (e.g., Bank of America®), or a card issuer (e.g., Vise). The interface device 120 can be a point of sale (POS) terminal that can communicate with the PTD 110 using a contact method (e.g., matching male and female contact pads) or a contactless method (e.g., RFID, Bluetooth, NFC, Wi-Fi, ZigBee).

For access control applications, the PTD 110 can be a smart access card for providing access to a facility or computer. The TPS 130 can be a server in a central computer system, or a dedicated access controller that controls an access to a facility or computer. Interface device 120 can be a card reader that can communicate with the PTD 110 using a contact method (e.g., contact pads) or a contactless method (e.g., RFID, Bluetooth, NFC, Wi-Fi, ZigBee).

In the illustrated example of FIG. 1, the PTD 110 includes a processing module 112 and a data storage device 114; the interface device 120 includes a processing module 122 and a data storage device 124; and the TPS 130 includes a processing module 132 and a data storage device 134. In some embodiments, the PTD 110 can include a biometric authentication module (not shown) that includes a biometric sensor and a controller. The processing modules 112, 122, and 132, depending on the application, may be a microprocessor, microcontroller, application-specific integrated circuit (ASIC), field-programmable gate array (FPGA), computer, server, or any combination of components or devices configured to perform and/or control the functions of the PTD 110, interface device 120, and TPS 130, respectively. The data storage devices 114, 124, and 134, depending on the application, may be a read-only memory (ROM), such as EPROM or EEPROM, flash, a hard disk, a database, or any other storage component capable of storing executory programs and information for use by the processing modules 112, 122, and 132, respectively.

Figure 2:
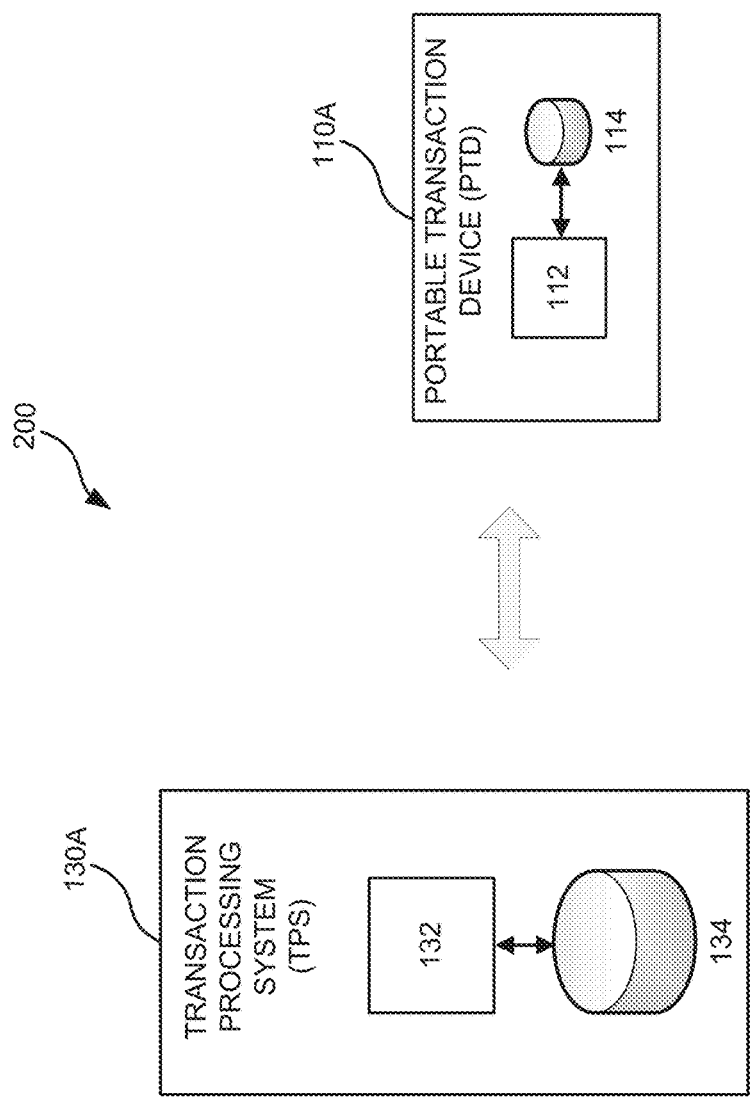
FIG. 2 is another block diagram of an example electronic transaction system within which various embodiments of the technology disclosed herein may be implemented.

FIG. 2 is a block diagram of an example electronic transaction system 200 that implements a threshold-based authentication procedure according to certain aspects of the present disclosure As illustrated in FIG. 2, electronic transactions occur between a portable transaction device (PTD) 110A and a transaction processing system (TPS) 130A without an interface device. By way of example, a shopper may use a smartphone equipped with a camera to capture an image of a code (e.g., bar or QR code) to make a payment for a product or service by transmitting payment information to a card payment processing system via a cellular network. By way of another example, an access card reader at a facility may store information (e.g., passwords and/or security tokens) associated with employees authorized to enter the facility and, upon reading an access card, may compare security information received from the card with the stored information and grant or deny access depending on the outcome of the comparison.

Figure 3:
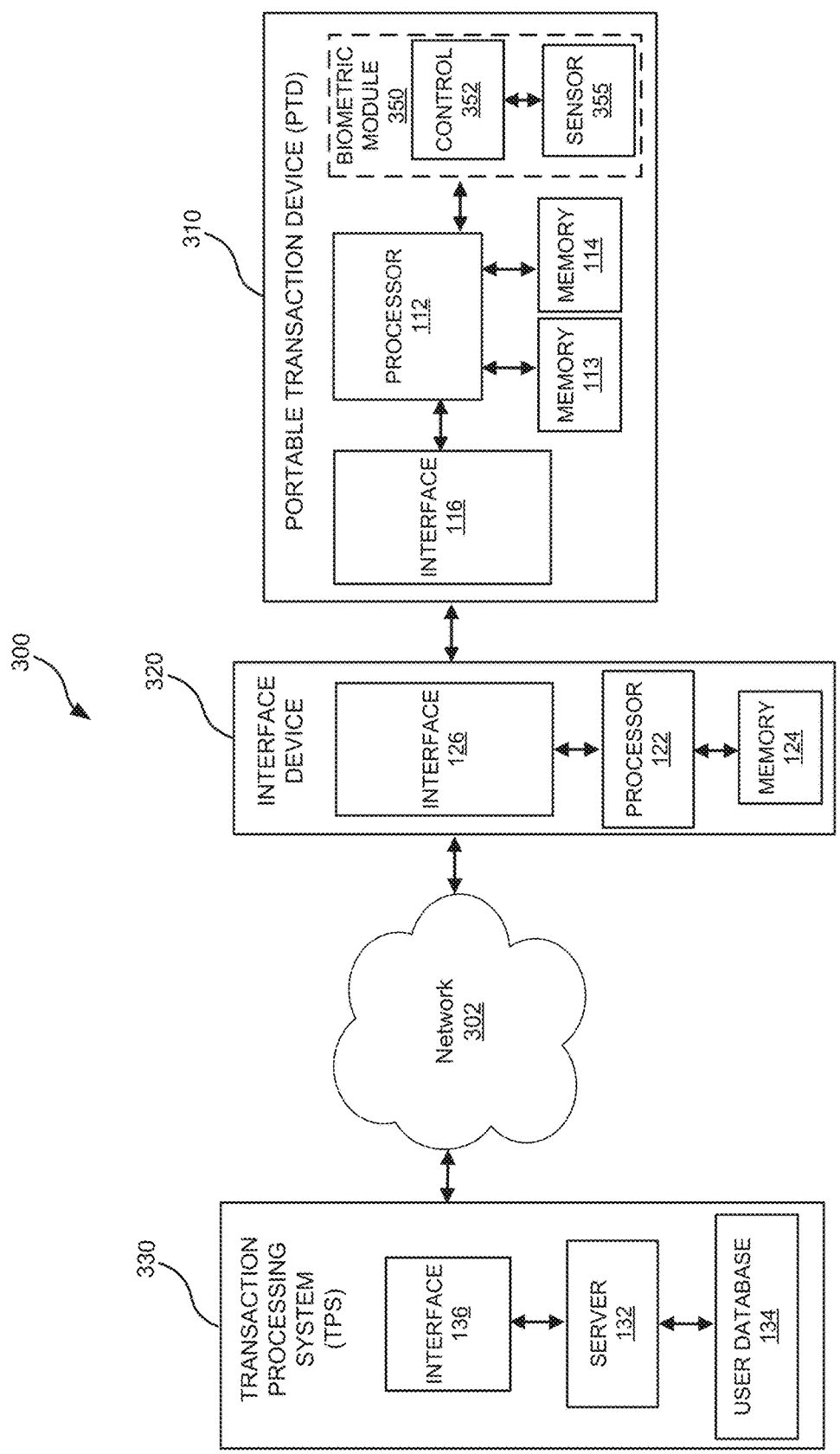
FIG. 3 is a block diagram of an example electronic transaction system implementing biometric security utilizing thresholds according to certain aspects of the present disclosure.

FIG. 3 is a block diagram of an example electronic transaction system 300 that can implement a threshold-based authentication procedure according to certain aspects of the present disclosure. In the illustrated example, the system 300 includes an electronic portable transaction device (PTD) 310, an interface device 320, and a transaction processing system (TPS) 330. In some embodiments, the PTD 310 is a smart card, in which case the interface device 320 can be a card reader. In some embodiments, the PTD 310 is a mobile device such as a smart phone, PDA, or tablet, in which case the interface device 320 can be an optical scanner or camera that can read a code presented on a display of the mobile device, or a Bluetooth, Wi-Fi or a near field communication (NFC) device that can communicate authentication- and/or transaction-related data between the mobile device and the TPS 330. In some embodiments, the PTD 310 is a smart card and the interface device 320 is a mobile device, in which case the smart card can perform authentication-related functions and the mobile device can provide a communication link between the smart card and the TPS 330.

In the illustrated embodiment of FIG. 3, the PTD 310 includes a processor 112, a memory 114, and an interface 116. In certain embodiments, the memory 114 can store a program that performs various communication and transaction functions of the PTD 310. The memory 114 can also store a password, token, and/or other identification information unique to the PTD 310. In some embodiments, the memory 114 can be part of the processor 112. In various embodiments, the PTD 310 may include a second memory. In such embodiments, the second memory may store one or more of the data items discussed above with regard to memory 114. In other embodiments, the second memory can store a record of previous transactions involving the PTD 310 and implement a reconciliation-based authentication for extra security of the PTD 310, such as the process disclosed in U.S. patent application Ser. No. 14/596,508, U.S. patent application Ser. No. 14/596,472, and U.S. patent application Ser. No. 14/596,420, the disclosures of which are herein incorporated by reference in their entirety. In various embodiments, the more than one memory may be a single memory component. The interface device 320 includes a processor 122, a memory 124, and an interface 126. The TPS 330 includes one or more processing modules including a server 132, one or more data storage devices including a user database 134, and an interface 136 for communicating with the interface device 320 via a communication network 302. In some embodiments, the user database 134 can store various data items relating to the PTD 310, including a password and data items relating to previously completed transactions involving the PTD 310.

The interface 116 and the interface 126 provide a communication link between the PTD 310 and the interface device 320. Using this communication link, the PTD 110 can communicate authentication- and/or transaction-related data with the interface device 120 and/or the TPS 130. In some embodiments, the PTD 110 can also receive power in the form of a voltage and/or current from the interface device 120 via the interfaces 116, 126. In certain embodiments, the interfaces 116, 126 can include a pair of male and female contact pads provided in the PTD (e.g., a smart card) and the interface device (e.g., a POS terminal). In some embodiments, the interfaces 116, 126 can include a pair of transceivers supporting wireless standards such as RFID, Bluetooth, Wi-Fi, NFT, and ZigBee. In some embodiments, the interface 116 can be a display of the mobile terminal that presents a code (e.g., a bar code or QR code) and the interface 126 can be an optical/infrared code scanner coupled to a POS terminal. In some embodiments, the interfaces 116,126 are a pair of wireless transceivers in a mobile device (e.g., a smartphone) and a POS terminal, respectively. In some embodiments, where the PTD 110 is a contactless smart card and the interface device 120 is a mobile device (e.g., a smartphone), the interfaces 116, 126 can include a pair of wireless transceivers in the contactless smart card and the mobile device, respectively.

In some embodiments, the PTD 110 is a mobile device that communicates with the TPS 130 via a wide area wireless network, such as a 3G UMTS or 4G LTE network, without the need for an interface device 120. In some embodiments, the PTD 110 is a smart card having a wireless capability that allows the card to communicate with the TPS 130 via a cellular network, such as a 3G UMTS or 4G LTE network, without the need for an interface device 120.

In certain embodiments, the processor 112 is configured to perform an authentication procedure using a security token stored in the memory 114. Such a token-based authentication procedure is known in the art, and an exemplary procedure is described in "EMV® Payment Tokenisation Specification, Technical Framework" version 1.0, March 2014, which is incorporated herein by reference for all purposes.

In certain embodiments, the PTD 110 can include a biometric authentication module 350 that includes a control 352 and a biometric sensor 355. In other embodiments, the biometric authentication module 350 can be in the interface device (e.g., a POS terminal) instead of in the PTD 110. Biometric authentication can begin with the collection of a digital biometric sample (e.g., bitmap image of user's fingerprint) using the biometric sensor 355. Useful features contained in the collected sample are then extracted and formatted into a template record that can be matched against other template records. In various embodiments, the template is stored at registration (and when combined with identity vetting, establishes an identity) in a memory (not shown) inside the biometric authentication module 350 or in one of the first and second memories 113, 114. When a transaction takes place, the biometric sensor 355 can measure the same biometric characteristic and the control 352 can process the measured biometric characteristic into a template format, and compare the template to the previously registered template.

Biometric measurements may vary slightly from one measurement to the next. This variation is not typically due to changes in the biometric feature being measured but to the mechanism and environment in which the data are captured. Therefore, a biometric sample measured at registration may not precisely match the results of the live sample measurement. As a result of this variability, in various embodiments a similarity score is generated and this score is compared against a pre-determined threshold value to determine what constitutes an acceptable match.

Enhanced security may be applied to electronic transactions only when the nature of the electronic transaction breaches a certain threshold associated with electronic transactions, such as financial transactions or access control transactions. With a reference to the embodiment of FIG. 3, in a threshold-based authentication procedure for a financial transaction, the threshold may be a threshold amount related to a PTD 310 can be stored in memory 114 of the PTD 310, memory 124 of the interface device 320, or the memory 134 of the TPS 330. When a user attempts a new financial transaction involving the PTD 310, a transaction amount associated with the transaction is determined. The transaction amount is the total value of all the goods and/or services a user is purchasing at a given time. In addition, the threshold amount is retrieved from the memory 114, 124, or 134, and compared with the determined transaction amount. In various embodiments, the comparison is performed by the processing module 132 at the TPS 330. In other embodiments, the comparison is performed by the processing module 122 at the interface device 120. In some embodiments, the comparison is performed by the processing module 112 at the PTD 310. In some embodiments, the comparison can be performed by more than one device. For example, in an embodiment where the PTD 310 is a smart card (e.g., a smart card payment), the TPS 330 is a payment processing system, and the interface device is a mobile terminal (e.g., a smartphone) that communicates with the smart card (using e.g., RFID, Bluetooth, NFC, Wi-Fi, or ZigBee) and the TPS 330 (using e.g., a cellular network), the smart card can perform one comparison and the mobile terminal can perform another comparison as described further below with respect to FIG. 5.

For access transactions, the threshold may be an access security level. The access security level is a value indicative of a security level associated with an access control domain (e.g., a lab in a facility). When a user attempts new access transaction involving the PTD 310, the access security level associated with an access control domain is compared with an access permission level associated with the PTD 310. In some embodiments, the access permission level, access security level, or both may be stored in one of the memory 114, 124, and 134. In various embodiments, the comparison is performed by the processing module 132 at the TPS 330. In other embodiments, the comparison is performed by the processing module 122 at the interface device 120. In some embodiments, the comparison is performed by the processing module 112 at the PTD 310. In some embodiments, the comparison can be performed by more than one device. For example, in an embodiment where the PTD 310 is a smart card (e.g., a smart card payment), the TPS 330 is a payment processing system, and the interface device is a mobile terminal (e.g., a smartphone) that communicates with the smart card (using e.g., RFID, Bluetooth, NFC, Wi-Fi, or ZigBee) and the TPS 330 (using e.g., a cellular network), the smart card can perform one comparison and the mobile terminal can perform another comparison as described further below with respect to FIG. 5.

In some embodiments, a threshold-based authentication procedure can be requested by a device that is different from a device that performs the threshold-based authentication procedure (e.g., comparison of the threshold amount and transaction amount). For example, the TPS 330 can send a request for a threshold-based authentication procedure in connection with a new financial transaction involving the PTD 310. In some embodiments, the TPS 330 can also send the threshold amount associated with PTD 310 stored in database 134. The processor 122 at the interface device 320 can receive the request and the threshold amount from the TPS 330, determine a transaction amount for the current transaction involving the PTD 310, and compare the threshold amount and the transaction amount for a match. In other embodiments, the interface device 320 passes the request and the threshold amount received from the TPS 330 to the PTD 310, and the processor 112 at the PTD 310 receives the request and the threshold amount from the interface device 320, determine a transaction amount for the current transaction involving the PTD, and compare the threshold amount and the transaction amount for a match. In some embodiments where the PTD 310 (e.g., a smartphone) has the capability to communicate with a cellular network, such as a 3G UMTS or 4G LTE network, the PTD 310 can receive the request and the threshold amount from the TPS 330 via the cellular network without involving an interface device such as a POS terminal.

In some embodiments, the PTD 310 can send a request for a threshold-based authentication procedure in connection with a new financial transaction involving the PTD 310. In some embodiments, the PTD 310 can also send a threshold amount involving the PTD 310 that are stored in the memory 114. The processor 122 at the interface device 320 can receive the request and the threshold amount from the PTD 310, determine a transaction amount associated with the current transaction, and compare the threshold amount and transaction amount for a match. In other embodiments, the interface device 320 passes the request and the threshold amount received from the PTD 310 to the TPS 330, and the processor (e.g., server) 132 at the TPS 330 receives the request and the threshold from the interface device 320, determines a transaction amount associated with the current transaction involving the PTD 310, and compares the threshold amount and the transaction amount for a match. In some embodiments where the PTD 310 (e.g., a smartphone) has the capability to communicate with a cellular network, such as a 3G UMTS or 4G LTE network, the PTD 310 can send the request and the first record to the TPS 330 via the cellular network without involving an interface device such as a POS terminal.

In some embodiments, the interface device 320 can request a threshold-based authentication procedure related to a financial transaction by sending a request to either the PTD 310 or the TPS 330. If the request is sent to the PTD 310, the processing module 122 at the interface device 320 can retrieve a threshold amount for transactions involving the PTD 310 from the user database 134 at the TPS 330 and send the threshold amount to the PTD 310. The processing module 112 at the PTD 310 can receive the request and the threshold amount from the interface device 320, determine a transaction amount for the current transaction involving the PTD 310, and perform a comparison between the threshold amount and the transaction amount for a match. In various embodiments, if the request is sent to the TPS 330, the processing module 122 at the interface device 320 can retrieve a threshold amount involving the PTD 310 from the memory 114 at the PTD 310 and send the threshold amount to the TPS 330. The server 132 at the TPS 330 can receive the request and the threshold amount from the interface device 320, determine a transaction amount for the current transaction involving the PTD 310, and perform a comparison between the threshold amount and the transaction amount for a match. In other embodiments, the TPS 330 may already store the threshold amount in memory 134

Although the above threshold-based authentication procedure has been described in regards to financial transactions, the same embodiments are applicable to access transactions. Instead of determining a transaction amount associated with the current transaction, the PTD 310, TPS 330, or interface device 320 may retrieve an access permission level associated with the PTD 310, described above. The same comparison process would occur.

Figure 4:
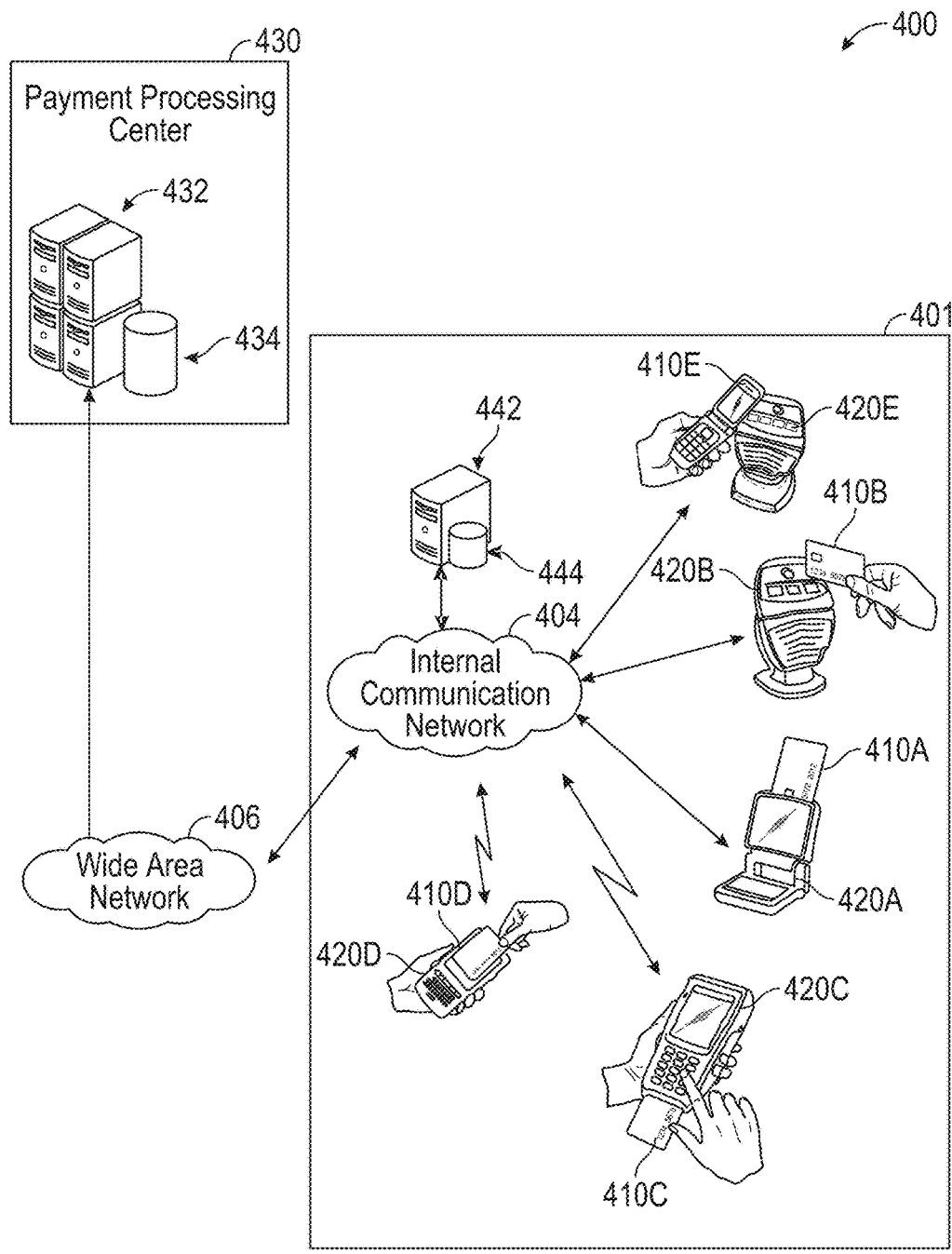
FIG. 4 is a block diagram of another example electronic transaction system implementing biometric security utilizing thresholds according to certain aspects of the present disclosure.

Various example arrangements of electronic transaction systems implementing a threshold-based authentication procedure are described below with respect to FIGS. 4-7. FIG. 4 depicts an example electronic payment transaction system 400 that implements a threshold-based authentication procedure according to certain aspects of the present disclosure. The system 400 includes a payment processing system 430 that includes one or more servers 432 and a user database 434 coupled to the servers 432. In some embodiments, the user database 434 can store various data items relating to card holders, including passwords, threshold amounts, and records of previously completed payment transactions. In various embodiments, the system 400 may include an internal or proprietary payment transaction system 401 of a merchant (e.g., Target®). Payment transaction system 401 may include various types of interface devices 420A-E that facilitate transaction-related communications between various types of portable payment transaction devices 410A-E and the server(s) 432 at the payment processing system 430. In the illustrated example, the portable payment transaction devices 410A-E are smart payment cards that can communicate with the interface devices 420A-E. Each of the portable payment transaction devices 410A-E can include all or some of the components 112, 114, 116, 350, 352, and 355 of the PTD 310 depicted in FIG. 3. Each of the interface devices 420A-E can include all or some of the components 122, 124, and 126 of the interface device 320 depicted in FIG. 3. In the illustrated embodiment, the merchant's internal payment transaction system 401 further includes a server 442 and a database 444 that can store data items relating to the merchant's customers including threshold amounts, passwords, tokens, and transaction records.

To enable communication between the payment processing system 430 and the merchant's internal payment transaction system 401, the interface devices 420A-E and the server 442 in the internal payment transaction system 401 have wired or wireless connections to an internal communication network 404 (e.g., Intranet), which is in turn connected a wide area network 406 (e.g., Internet). In this manner, the POS terminals 420A-E, the smart payment cards 410A-E, and the server 442 can engage in data communication with the server(s) 432 at the payment processing system 430.

In the illustrated example of FIG. 4, the interface device 420A is a fixed point of sale (POS) terminal that is configured to operate with a contact smart payment card 410A and has a wired connection (e.g., wired Ethernet) to the internal communication network 404. During a payment transaction, the contact smart payment card 410A is inserted into the POS terminal 420A for data communication. For this purpose, the contact smart payment card 410A can be equipped with male contact pads and the POS terminal 420A can be equipped with corresponding female contact pads or vice versa. Other methods of providing contact-based communication coupling between the contact smart payment card 410A and the POS terminal 420A, including micro connectors, can be utilized.

The interface device 420B is a fixed POS terminal that is configured to operate with a contactless smart payment card 410B and has a wired connection (e.g., wired Ethernet) to the internal communication network 404. During a payment transaction, the contactless smart payment card 410B is placed adjacent to the POS terminal 420B for wireless data communication. For this purpose, the contactless smart payment card 410B and the POS terminal 420B can be equipped with transceivers based on a wireless standard or technology, such as RFID, Bluetooth, NFC, Wi-Fi, and ZigBee.

The interface device 420C is a portable POS terminal that is configured to operate with a contact smart payment card 410C, and the portable POS terminal 420C has a wireless connection (e.g., wireless Ethernet) to the internal communication network 404. During a payment transaction, the contact smart payment card 410C is inserted into the portable POS terminal 420C for data communication. In various embodiments, the contact smart payment card 410C can be equipped with male contact pads and the POS terminal 420C can be equipped with corresponding female contact pads or vice versa. Other methods of providing contact-based communication coupling between the contact smart payment card 410C and the POS terminal 420C including, micro connectors, can be utilized.

The interface device 420D is a portable POS terminal that is configured to operate with a contactless smart payment card 410D, and POS terminal 420D has a wireless connection (e.g., wireless Ethernet) to the internal communication network 404. During a payment transaction, the contactless smart payment card 410D is placed adjacent to the portable POS terminal 420D for wireless data communication. For this purpose, the contactless smart payment card 410D and the POS terminal 420D can be equipped with transceivers based on a wireless standard or technology, such as RFID, Bluetooth, NFC, Wi-Fi, and ZigBee.

The interface device 420E is a fixed POS terminal that is configured to operate with a mobile device (e.g., a smartphone, PDA, tablet), and has either a wired connection (e.g., wired Ethernet) or a wireless connection (e.g., Wi-Fi) to the internal communication network 404. During a payment transaction, the mobile terminal 410E is placed adjacent to the POS terminal 420E for wireless data communication. For this purpose, the mobile terminal 410E and the POS terminal 420E can be equipped with transceivers based on a wireless standard or technology such as RFID, Bluetooth, NFC, Wi-Fi, and ZigBee. In certain alternative embodiments, the POS terminal 420E can have a wireless connection (e.g., wireless Ethernet) to the internal communication network 404. In some embodiments, the POS terminal 420E can be equipped with an optical scanner or camera that can read a code (e.g., bar code or QR code) displayed on a display of the mobile terminal 410E.

For ease of illustration only, without any intent to limit the scope of the present disclosure in any way, various aspects of operation of the electronic payment transaction system 400 will be described with respect to a financial transaction involving the contact smart payment card 410A and the POS terminal 420A. It shall be appreciated by those skilled in the art in view of the present disclosure that the described operation is applicable to other portable transaction devices (e.g., 410B-E) and interface devices (e.g., 420B-E), and for different types of transactions, such as access transactions (e.g., access to a facility or computer).

In operation, a new transaction is initiated when a user presents the smart payment card 410A at the POS terminal 420A to pay for products and/or services by, for example, inserting the card 410A into the POS terminal 421 as shown in FIG. 4. Before authorizing the new transaction, a threshold-based authentication procedure may be performed to determine whether the transaction is of sufficient worth and importance to require additional authentication of the user. For example, card 410A in coordination with the POS terminal 420A and/or the payment processing system 432 can determine whether the nature of the transaction required additional security and, if so, initiate a token-based authentication procedure. Optionally, the card 410A, a biometric authentication procedure may be initiated. To further enhance security of the transaction, a reconciliation-based authentication procedure may be performed before, during, or after a token-based authentication and/or a biometric based-authentication.

In certain embodiments, such additional authentication procedures may not be needed or desired. In various embodiments, a threshold-based authentication procedure is performed at the payment processing system 430. By way of example, after making a data connection with the card 410A, the POS terminal 420A can retrieve (e.g., request and receive) a threshold amount from the card 410A. The POS terminal 420A can also determine a transaction amount for the current transaction involving the card 410A. The POS terminal 420A can send a request for approval of the new transaction to the payment processing system 430 along with the threshold amount retrieved from the card 410A and the determined transaction amount. The server(s) 432 at the payment processing system 420 receives the request, the threshold amount, and the transaction amount, and performs a comparison of the threshold amount and the transaction amount.

In certain embodiments, the threshold-based authentication procedure is performed at the POS terminal 420A. By way of example, after making a data connection with the card 410A, the POS terminal 420A can retrieve a threshold amount and a transaction amount from the card 410A. The processor 122 at the POS terminal 420A performs a threshold-based authentication by determining whether the transaction amount received from the card 410A matches or exceeds the threshold amount. In some embodiments, the POS terminal 420A can determine the transaction amount instead of receiving the transaction amount from card 410A.

In certain embodiments, the threshold-based authentication is performed at the smart payment card 410A. By way of example, after making a data connection with the card 410A, the POS terminal 420A can retrieve a threshold amount from server(s) 432 at the payment processing system 420. The POS terminal 420A, upon receiving the threshold amount from the payment processing system, sends the threshold amount to the card 410A. The processor 112 at the card 410A performs a threshold-based authentication by comparing a transaction amount associated with the current transaction determined by the card 410A with the threshold amount received from the payment processing system 430 via the POS terminal 420A.

Figure 5:
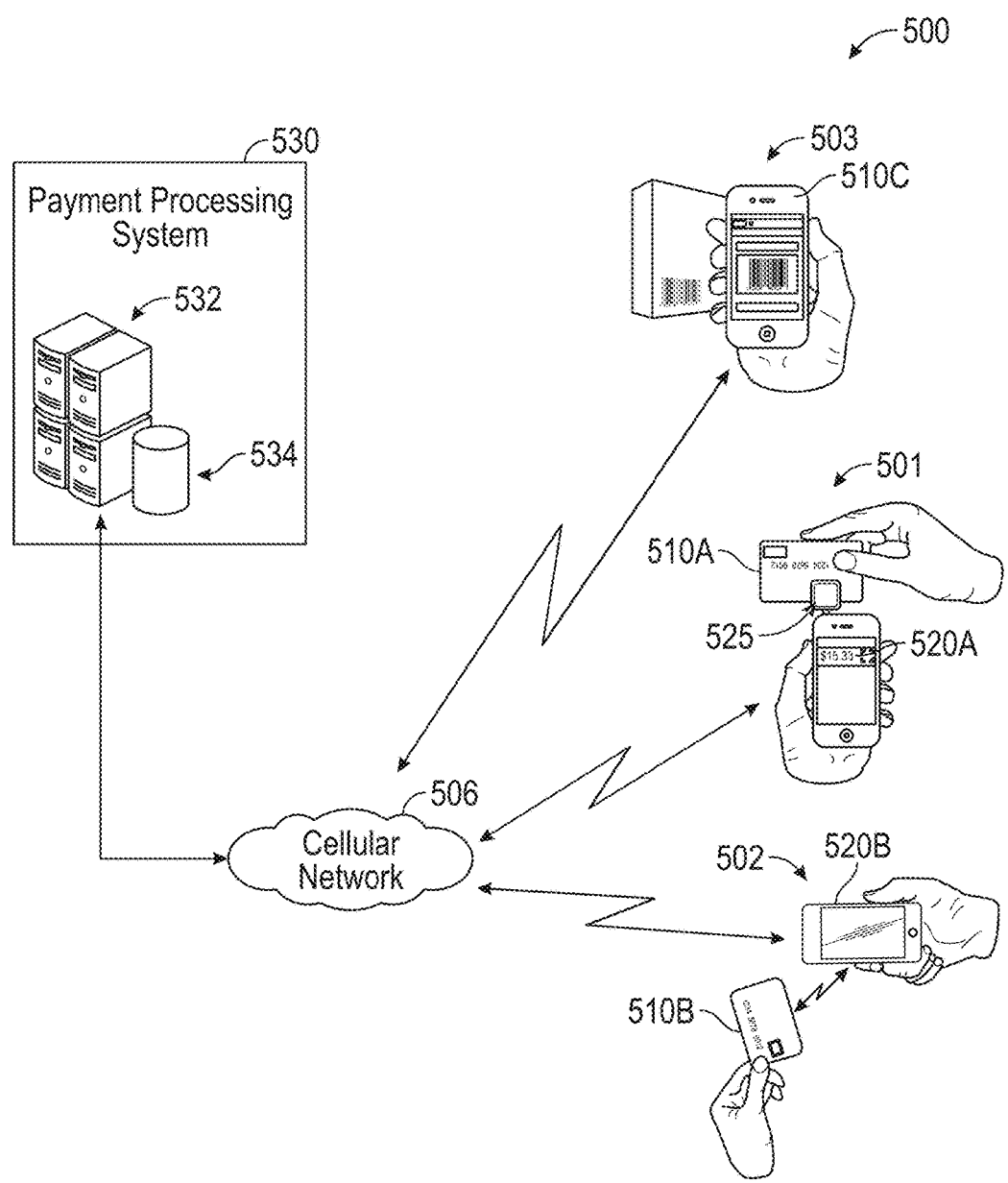
FIG. 5 is a block diagram of another example electronic transaction system implementing biometric security utilizing thresholds according to certain aspects of the present disclosure.

FIG. 5 depicts another example electronic payment transaction system 500 that implements a threshold-based authentication procedure according to certain aspects of the present disclosure. The system 500 includes a payment processing system 530 that includes one or more servers 532 and a user database 534 coupled to the server(s) 532. The sever(s) 532 conduct different types of electronic payment transactions 501, 502, 503 with mobile terminals 520A-C via a cellular network 506.

The first electronic payment transaction 501 involves a contact smart payment card 510A coupled to the mobile terminal 520A via a smart card reader 525 and conducting a payment transaction with the payment processing system 530 via the cellular network 506. The second electronic payment transaction 502 involves a contactless smart payment card 510B wirelessly coupled to the mobile terminal 520B and conducting a payment transaction with the payment processing system 530 via the cellular network 506. The third electronic payment transaction 503 involves the mobile terminal 510C as a portable transaction device and an interface device. In some embodiments, mobile terminal 510 can capture an image of a code (e.g., a bar or QR code) associated with a product printed on a package of the product, in a catalog, or advertisement using an image capture device (e.g., a camera) and conducting a payment transaction for the product with the payment processing system 530 via the cellular network 506.

In each of these payment transactions 501, 502, 503, a threshold-based authentication procedure similar to the threshold-based authentication procedures described above with respect to FIGS. 1-4 can be performed prior to initiating token-based or biometric-based authentication procedures. In the first payment transaction 501, a comparison of a threshold amount and a transaction amount involving the smart payment card 510A can be performed by the server(s) 532 at the payment processing system 530, a processor in the mobile terminal 520A, or a processor in the smart payment card 510A. The threshold amount can be stored in a memory in the smart payment card 510A, in the database 534 at the payment processing system 530, or in a memory in the mobile terminal 520A.

For the second payment transaction 502 a comparison of a threshold amount and a transaction amount involving the smart payment card 510B can be performed by server(s) 532 at the payment processing system 530, a processor in the mobile terminal 520B, or a processor in the smart payment card 510B. The first record can be stored in a memory in the smart payment card 510B, the database 534 at the payment processing system 530, or in a memory in the mobile terminal 520B.

For the third payment transaction 503, a comparison of a threshold amount and a transaction amount involving the mobile terminal 510C can be performed by server(s) 532 at the payment processing system 530 or a processor in the mobile terminal 510C. The first record can be stored in a memory in the mobile terminal 510C, and the second record can be stored in the database 534.

Figure 6:
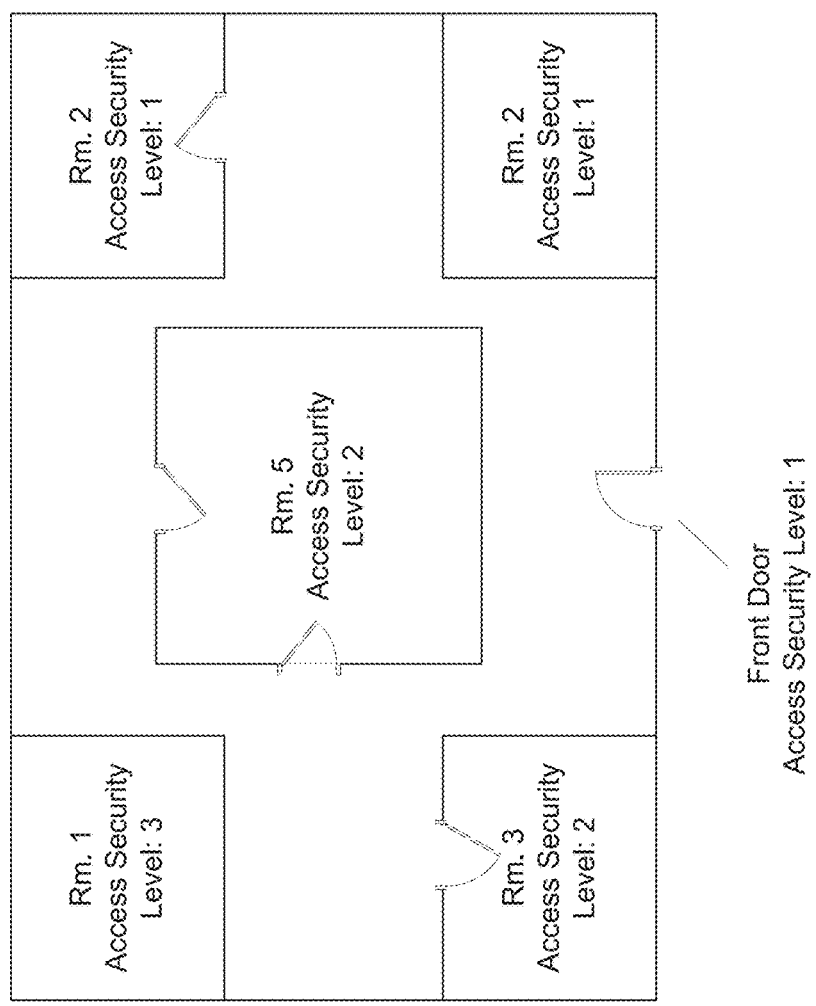
FIG. 6 is a block diagram of an example computer access control system implementing biometric security utilizing thresholds according to certain aspects of the present disclosure.

The threshold-based authentication procedure may be implemented in an access control system. The access control system may be implemented for access to a facility, one or more rooms within the facility, a computing device, a computer network, or a combination thereof. FIG. 6 illustrates an example facility implementing a threshold-based authentication procedure in accordance with the present disclosure. As illustrated in FIG. 6, each access domain within the facility is assigned an access security level. In various embodiments, the access domain may be an entry way to a lab or office within a facility and/or the exterior doors of the facility. For example, a facility that includes work under government contracts with varying levels of security may designate labs for each level of security applicable (e.g., confidential, secret, top secret). In the illustrated embodiment, each security level is given a numerical value to indicate the level of security required. In other embodiments, the access security level may be text-based.

In other embodiments, the access domain may include one or more computing device, such as a desktop, laptop, or other computing equipment implemented in a facility. In other embodiments, the access domain may be one or more computing networks implemented within an access control system. For example, a facility operator may employ multiple computer networks, one for each of various security levels.

Figure 7:
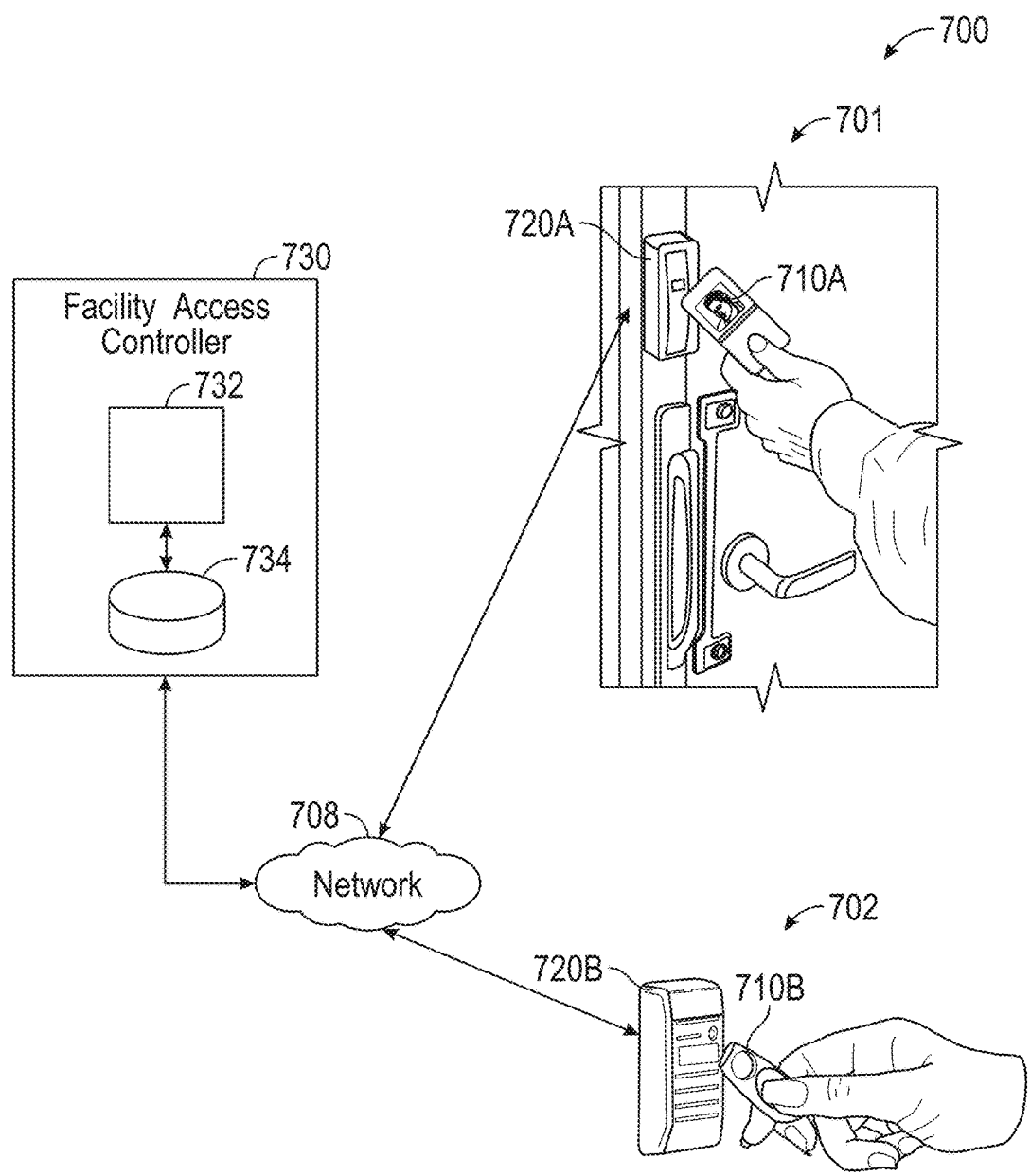
FIG. 7 is a block diagram of an example facility within which a facility access control system according to certain aspects of the present disclosure may be implemented.

FIG. 7 depicts an exemplary facility access control system 700 that implements a threshold-based authentication procedure according to certain aspects of the present disclosure. FIG. 7 illustrates a first facility access transaction 710 involving a smart access card 710A and a card reader 720A, and a second facility access transaction 720 involving a smart access fob 710B and a fob reader 720B. In the illustrated example, the system 700 further includes a central facility access controller 730 that includes a processing module 732 and a data storage 734 coupled to the processing module 732. The processing module 732 is communicatively connected to the card reader 720A and the fob reader 620B via a communication network 708, which can be a local area network (LAN) or a wide area network (WAN).

In the first facility access transaction 701, a user presents the smart access card 710A to the card reader 720B to gain access to a facility. The card reader 720B can communicate with the card 710A using one of various contact or contactless methods, including non-limiting examples described above. In the second facility access transaction 702, a user presents the smart access fob 710A to the fob reader 720B to gain access to the facility.

In each of these facility access transactions 701, 702, a threshold-based authentication procedure similar to the threshold-based authentication procedures described above with respect to FIGS. 1-4 can be performed to determine if a token-based authentication and/or a biometric-based authentication is required. For the first facility access transaction 701, a comparison of an access security level associated with an access domain and an access permission level associated with the smart access card 710A can be performed by the processing module 732 at the central facility access controller 730, a processor in the card reader 720A, or a processor in the smart access card 710A. The access security level and the access permission level can be stored in a memory in the smart access card 710A, the databased 734, in a memory in the card reader 730A, or a combination thereof. For the second facility access transaction 702, a comparison of an access security level associated with an access domain and an access permission level associated with the smart access fob 710B can be performed by the processing module 732 at the central facility access controller 730, a processor in the fob reader 720B, or a processor in the smart access fob 710B. The access security level and the access permission level can be stored in a memory in the smart access fob 710B, the database 734, in a memory in the fob reader 720B, or a combination thereof.

Figure 8:
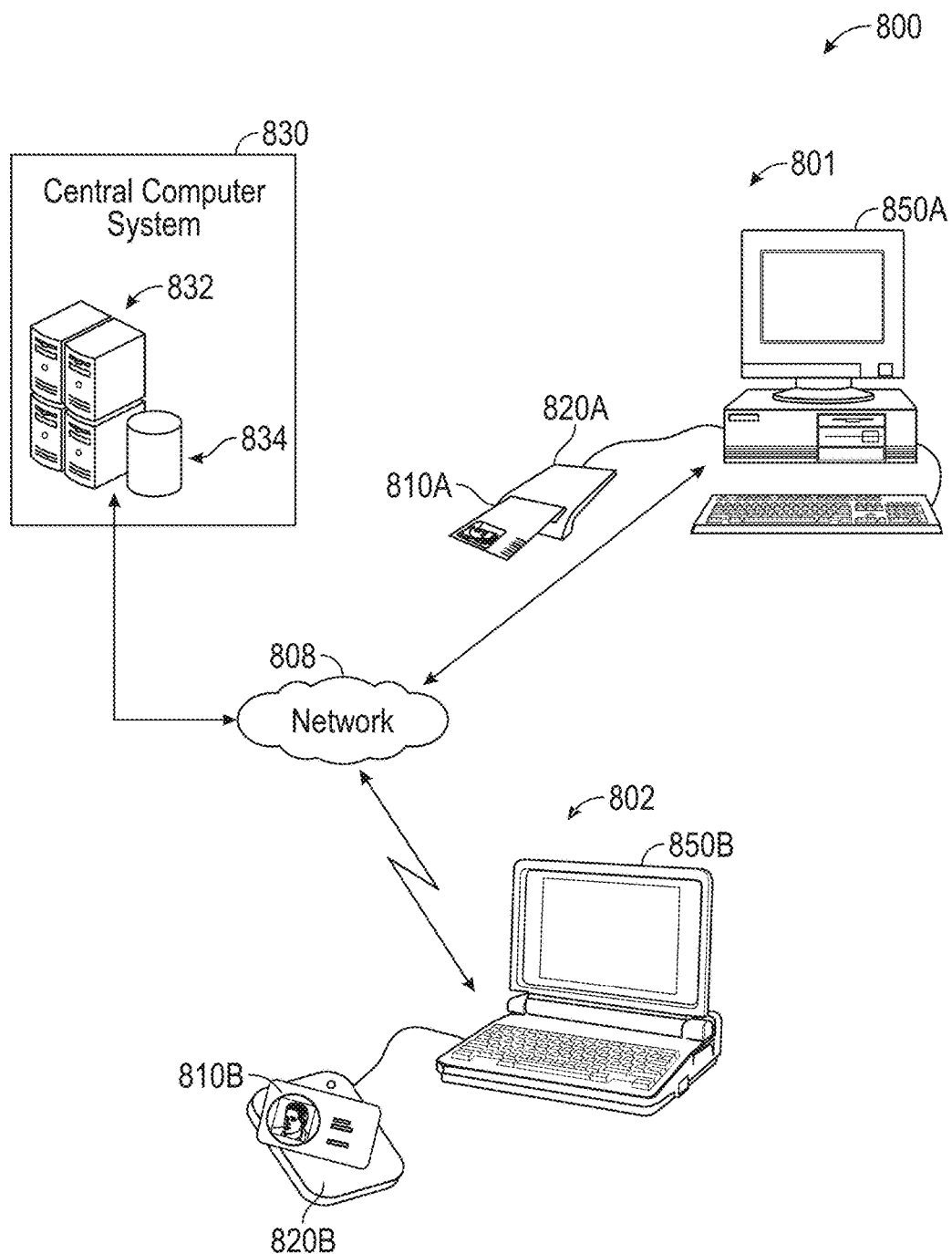
FIG. 8 is a block diagram of an example facility access control system implementing biometric security utilizing thresholds according to certain aspects of the present disclosure.

FIG. 8 depicts an exemplary computer access control system 800 that implements a threshold-based authentication procedure according to certain aspects of the present disclosure. FIG. 8 illustrates a first computer access transaction 801 involving a contact smart access card 810A and a card reader 820A, and a second computer access transaction 802 involving a contactless smart access card 810B and a card reader 820B. In the illustrated example, the system 800 further includes a central computer system 830 that includes one or more servers 832 and a database 834 coupled to the server(s) 832. The sever(s) 832 is connected to the computers 850A, 820B via a network 808, which can be a local area network (LAN) or a wide area network (WAN). In certain embodiments, the system 800 can allow a first group of users to access files and applications stored in and running on the computers 850A, 850B and allow a second group of users to access files and applications stored in and running on the computers 850A, 850B and the server(s) 832 and the database 834 in the central computer system 830.

In the first computer access transaction 801, a user can insert a contact smart access card 810A into a card reader 820A coupled to the desktop computer 850A for access to the desktop computer 850A and/or the central computer system 832. In the illustrated example, the desktop computer 850A is coupled to the network 808 via a wired connection. In the second computer access transaction 802, a user can place a contactless smart access card 810B adjacent to a card reader 820B coupled to a laptop computer 850B for access to the laptop computer 850B and/or the server(s) 832 and the database 834 in the central computer system 830. The laptop computer 850B is coupled to the network 808 via a wireless connection.

In each of these computer access transactions 801, 802, a threshold-based authentication procedure similar to the threshold-based authentication procedures described above with respect to FIGS. 1-4 can be performed to determine whether a token-based authentication and/or a biometric-based authentication is required. For the first computer access transaction 801, a comparison of an access security level associated with an access domain and an access permission level associated with the smart access card 810A can be performed by server(s) 832 at the central computer system 830, a processor in the card reader 820A, a processor in the smart access card 810A, or a processor in the desktop computer 850A. The access security level and the access permission level can be stored in a memory in the smart access card 810A, the database 834, in a memory in a desktop computer 850A, or a combination thereof. For the second computer access transaction 802, a comparison of an access security level associated and access domain and an access permission level associated with the smart access card 810B can be performed by server(s) 832 at the central computer system 830, a processor in the card reader 820B, a processor in the smart access card 810B, or a processor in the laptop computer 850B. The access security level and the access permission level can be stored in a memory in the smart access card 610B, the database 834, in a memory in the laptop computer 850B, or a combination thereof. In certain embodiments, a dedicated computer access controller (not shown) can be employed to control access to the computers 850A, 850B and/or the central computer system 830, a processing module (e.g., a processor) in the controller can perform one or more of a token-based authentication, a biometric-based authentication, and a reconciliation-based authentication, and a data storage device (e.g., a memory) in the controller can store records of computer access transactions for different users.

Although financial transactions and access control transactions have been described separately, the same basic threshold-based authentication process applies. A parameter associated with the electronic transaction involving an electronic portable transaction device (transaction amount/access security level) is compared with a threshold (threshold amount/access permission level). If the parameter exceeds the threshold, additional authentication procedures may be initiated. If the parameter does not exceed the threshold, the transaction may be completed without further authentication of the user.

Figure 9:
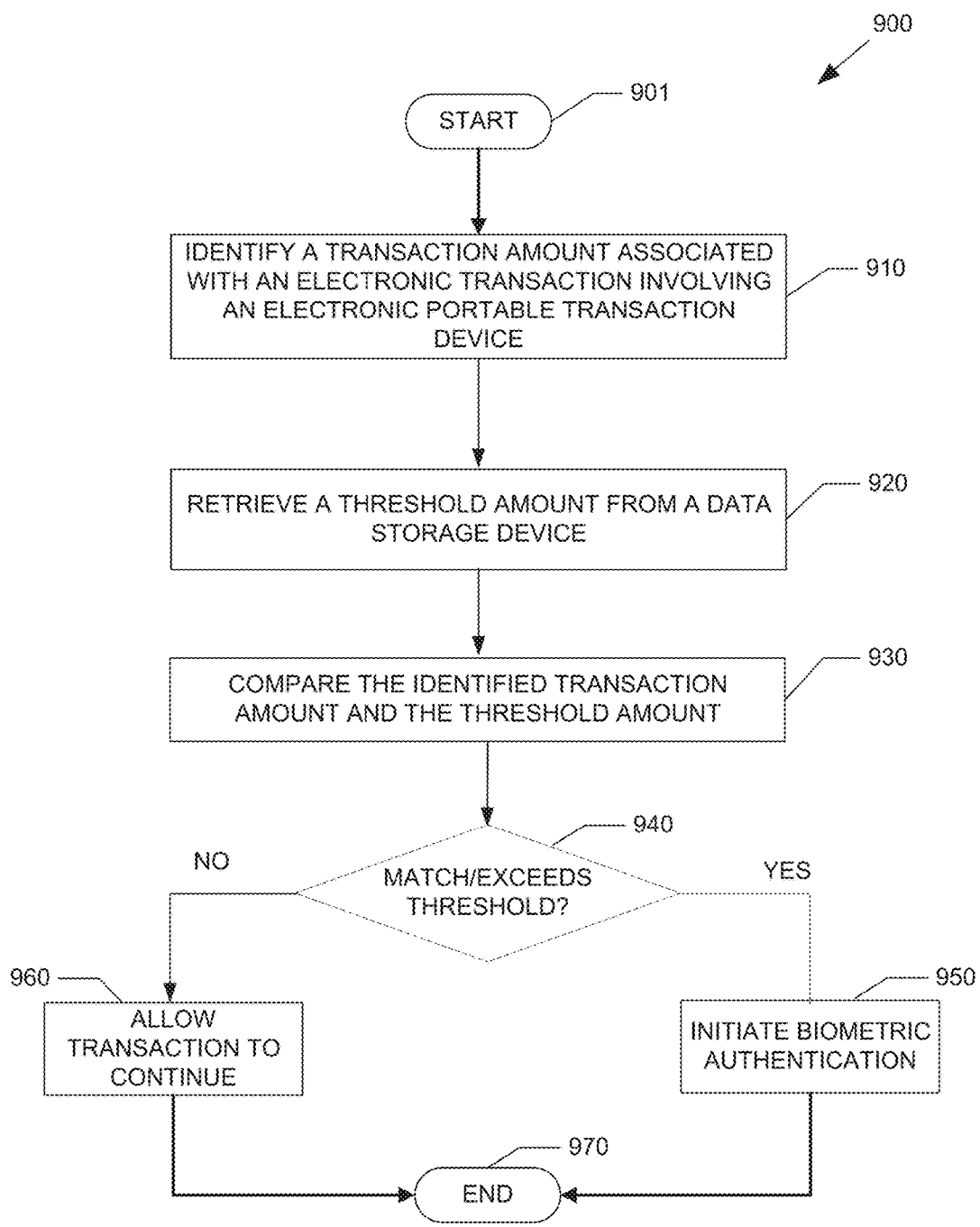
FIG. 9 is a flowchart illustrating an example biometric security utilizing thresholds for financial transactions according to certain aspects of the present disclosure.

FIG. 9 is a flowchart illustrating an example process 900 for a threshold-based authentication procedure for financial transactions according to certain aspects of the present disclosure.

The process 900 starts at state 901 and proceeds to operation 910, in which a processing module in a device identifies a transaction amount associated with an electronic transaction involving an electronic portable transaction device. The transaction amount is a total of all the goods and/or services a user is requesting to purchase during the transaction. The identification may be performed by an electronic portable transaction device, a transaction processing system configured to process financial transactions involving the electronic portable transaction device, or an interface device configured to facilitate communications between the electronic portable transaction device and the transaction processing system. Non-limiting examples of the electronic portable transaction device a smart payment card or a mobile terminal configured for payment transactions. Non-limiting examples of the interface device include a fixed or portable POS terminal, a mobile terminal, and a contract or contactless smart card or smart fob readers.

The process 900 proceeds to operation 920, in which a processing module in the authentication device retrieves a threshold amount from a data storage device. The data storage device can be a memory (e.g., database) at the transaction processing system, a memory in the electronic portable transaction device, or a memory in the interface device. The data storage device may be in the authentication device or in another device in the electronic transaction system. The threshold amount may be a predetermined amount above which biometric authentication is required before the transaction is allowed to be completed.

The process 900 proceeds to operation 930, in which a processing module in the authentication device compares the identified transaction amount and the threshold amount.

The process 900 proceeds to query state 940, in which a processing module in the authentication device determines if the transaction amount matches or exceeds the threshold amount. If the answer to the query is "yes" (i.e., the transaction amount exceeds the threshold), the process 900 proceeds to operation 850, in which the processing module initiates biometric authentication. In various embodiments, the authentication device may include a biometric authentication module, such as the module discussed above with regards to FIG. 3, and initiating biometric authentication includes requesting the user to enter biometric data through the biometric sensor. In other embodiments, the biometric authentication module may be included in a device other than the authentication device, and initiating biometric authentication includes sending a request to another device to obtain biometric data through the biometric sensor.

On the other hand, if the answer to the query at the state 940 is "no" (i.e., the transaction amount is less than the threshold amount), the process 900 proceeds to operation 960, in which a processing module in the authentication device allows the transaction to continue without requiring additional biometric authentication. The process 900 ends a state 970.

Figure 10:
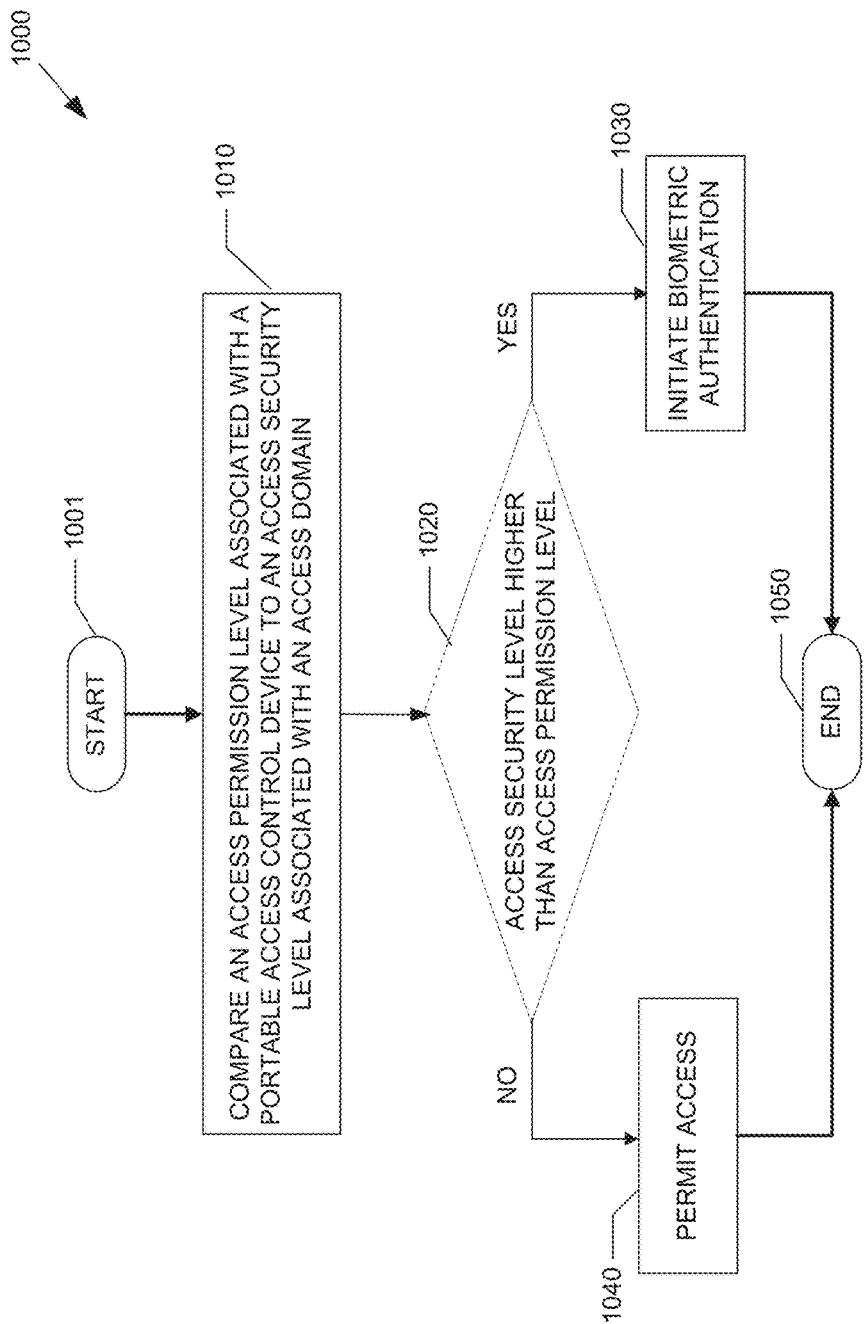
FIG. 10 is a flowchart illustrating an example biometric security utilizing thresholds for access control transactions according to certain aspects of the present disclosure.

FIG. 10 is a flowchart illustrating an example process 1000 for a threshold-based authentication procedure for access control transactions according to certain aspects of the present disclosure. The process 1000 starts at state 1001 and proceeds to operation 101, in which a processing module in a device compares an access permission associated with an electronic portable transaction device and an access security level associated with an access domain. The process 1000 proceeds to query state 1020, in which the device determined if the access security level associated with the access domain is higher than the access permission level associated with the electronic portable transaction device. If the answer to the query is "yes" (i.e., the access security level exceeds the access permission level), the process 1000 proceeds to operation 1030, in which the processing module initiates biometric authentication. In various embodiments, the device may include a biometric authentication module, such as the module discussed above with regards to FIG. 3, and initiating biometric authentication includes requesting the user to enter biometric data through the biometric sensor. In other embodiments, the biometric authentication module may be included in a device other than the device performing the threshold-based authentication procedure, and initiating biometric authentication includes sending a request to the other device to obtain biometric data through the biometric sensor.

On the other hand, if the answer to the query at the state 1020 is "no" (i.e., access security level is less than the access permission level), the process 1000 proceeds to operation 1040, in which a processing module in the device permits access to the access domain without requiring additional biometric authentication. The process 1000 ends a state 1050.

It shall be appreciated by those skilled in the art in view of the present disclosure that there are numerous possible pairs of a requesting device and an authentication device. In the electronic payment system 400 of FIG. 4, for example, the requesting device can be one of the interface devices 420A-E and the authentication device can be the corresponding one of the portable transaction devices 410A-E, or vice versa. Alternatively, the requesting device can be one of the portable transaction devices 410A-E and the authentication device can be server(s) 432 at the payment processing system 430, or vice versa. Alternatively, the requesting device can be the server(s) 432 at the payment processing system 430 and the authentication device can be one of the interface devices 420A-E, or vice versa. In the electronic payment system 500 of FIG. 5, the requesting device can be one of the mobile terminals 520A-B and the authentication device can be one of the smart payment cards 510A-B, or vice versa. Alternatively, the requesting device can be one of the mobile terminals 520A-C and the authentication device can be the server(s) 532 at the payment processing system 530, or vice versa. Alternatively, the requesting device can be the server(s) 532 at the payment processing system 530 and the authentication device can be one of the smart payment cards 510A-B, or vice versa.

Figure 11:
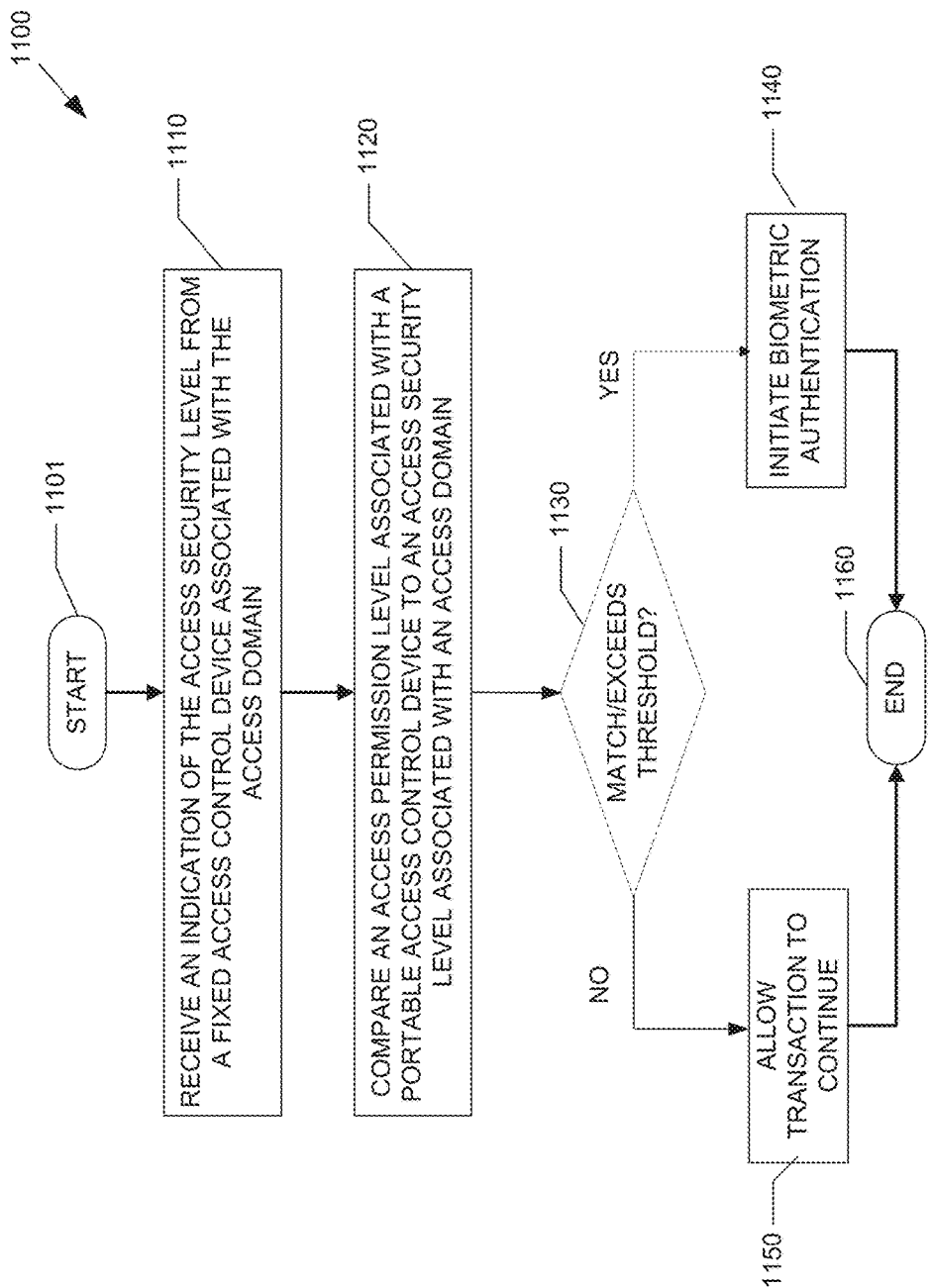
FIG. 11 is a flowchart illustrating an example of biometric security utilizing thresholds implemented in a portable access control device according to certain aspects of the present disclosure.

FIG. 11 is an example embodiment the access transaction threshold-based authentication procedure of FIG. 10 where the authentication device is an electronic portable transaction device. The process 1100 begins at 1101 and proceeds to 1110, where the electronic portable transaction device receives an indication of the access security level from a fixed access control device associated with the access domain. In various embodiments, the fixed access control device may be a smart access card or smart fob reader connected to the locking mechanism of an entry way to a facility or area of a facility, or connected to a computer or computing system. In various embodiments, the fixed access control device may be connected with an access control system and have access to a database of the access control system. The process 1100 proceeds to operation 1120, where the access security level and the access permission level are compared to determine if biometric authentication is required. Operations 1120, 1130, 1140, and 1150 operate in a similar fashion as operations 1010, 120, 1030, and 1040 of FIG. 10.

FIG. 12 is an example embodiment the access transaction threshold-based authentication procedure of FIG. 10 where the authentication device is a fixed access control device. The process 1200 begins at 1201 and proceeds to 1210, where the fixed access control device receives a request to access an access domain from a portable access control device. In various embodiments, the fixed access control device may be a smart access card or smart fob reader connected to the locking mechanism of an entry way to a facility or area of a facility, or connected to a computer or computing system. In various embodiments, the fixed access control device may be connected with an access control system and have access to a database of the access control system.

The process 1200 proceeds to operation 1220, where the fixed access control device receives an indication of an access permission level associated with the electronic portable transaction device from the electronic portable transaction device. The access permission level may be stored in a memory within the electronic portable transaction device. The process 1200 proceeds to operations 1230, 1240, 1250, and 1260, which operate in a similar way to operations 1010, 1020, 1030, and 1040 of FIG. 10.

It shall be appreciated by those skilled in the art in view of the present disclosure that various described operations of the exemplary processes 900, 1000, 1100, and 1200 may be performed in different orders, optionally skipped, and/or removed.

The description of the technology is provided to enable any person skilled in the art to practice the various embodiments described herein. While the technology has been particularly described with reference to the various figures and embodiments, it should be understood that these are for illustration purposes only and should not be taken as limiting the scope of the various embodiments.

There may be many other ways to implement the various embodiments. Various functions and elements described herein may be partitioned differently from those shown without departing from the spirit and scope of the technology disclosed. Various modifications to these embodiments will be readily apparent to those skilled in the art, and generic principles defined herein may be applied to other embodiments. Thus, many changes and modifications may be made to the various embodiments, by one having ordinary skill in the art, without departing from the spirit and scope of the various embodiments.

A reference to an element in the singular is not intended to mean "one and only one" unless specifically stated, but rather "one or more." The term "some" refers to one or more. Underlined and/or italicized headings and subheadings are used for convenience only, do not limit the scope of the various embodiments, and are not referred to in connection with the interpretation of the description of the embodiment. All structural and functional equivalents to the elements of the various embodiments of the technology described throughout this disclosure that are known or later come to be known to those of ordinary skill in the art are expressly incorporated herein by reference and intended to be encompassed by the technology disclosed. Moreover, nothing disclosed herein is intended to be dedicated to the public regardless of whether such disclosure is explicitly recited in the above description.

We claim:

1. A method of selectively initiating biometric authentication in an access control system, the method performed by an electronic portable access control device that includes a physical processor and a biometric authentication module, comprising:
    (a) digitally collecting by the physical processor a user's fingerprint as a template in a program stored within the electronic portable access control device via a fingerprint scanner on the electronic portable access device, wherein the electronic portable access control device is a smart card;
    (b) accessing by the physical processor from a storage device within the electronic portable access control device, an access permission level associated with the electronic portable access control device, the access permission level specifying which access security level or levels associated with an access domain a user of the electronic portable access control device has permission to access, wherein the access domain is a controlled access point in a facility;
    (c) receiving by the physical processor an indication of a first access security level associated with the access domain from a fixed access control device associated with the access domain, wherein the fixed access control device is located at the controlled access point such that the electronic portable access control device engages in a communication with the fixed access control device;
    (d) comparing by the physical processor the access permission level associated with the electronic portable access control device to the first access security level associated with the access domain;
    (e) initiating by the physical processor a biometric authentication process using the biometric authentication module and the fingerprint template if the first access security level associated with the access domain is higher than the access permission level associated with the electronic portable access control device and if the biometric authentication process is successful, permitting an access to the access domain; and
    (f) permitting by the physical processor an access to the access domain without performing Step (e) if the first access security level associated with the access domain is less than the access permission level associated with the electronic portable access control device; and
    wherein the access permission level comprises a numerical value representing a security clearance level of a plurality of security clearance levels and the first access security level comprises a numerical value representing a security clearance level of the plurality of security clearance levels.

2. The method of claim 1, wherein the step of initiating a biometric authentication comprises requesting a user to enter biometric data via the fingerprint scanner of the electronic portable access control device.

3. The method of claim 1, further comprising receiving a request to access the access domain from the electronic portable access control device.

4. The method of claim 1, further comprising receiving an indication of the access permission level from the electronic portable access control device.

5. The method of claim 1, wherein the electronic portable access control device comprises a biometric scanner and the step of initiating a biometric authentication comprises requesting a user to input biometric data via the fingerprint scanner of the electronic portable access control device.

6. The method of claim 1, wherein the access domain further includes one or more an area within the facility, a computer, a computer network, or a combination thereof.

7. An electronic portable access control device, comprising:
    a data storage device configured to store data indicative of an access permission level associated with the electronic portable access control device, wherein the electronic portable access control device is a smart card, the access permission level specifying which access security level or levels associated with an access domain a user of the electronic portable access control device has permission to access, wherein the access domain is a controlled access point in a facility;
    a biometric authentication module comprising a fingerprint scanner;

a processing module configured to execute a program configured to:
digitally collect the user's fingerprint as a template within the electronic portable access control device;
access from the data storage device the data indicative of the access permission level associated with the electronic portable access control device;
receive an indication of a first access security level associated with the access domain from a fixed access control device associated with the access domain;
compare the access permission level associated with the electronic portable access control device to the first access security level associated with the access domain;
initiate a biometric authentication process using the biometric authentication module and the fingerprint template if the first access security level associated with the access domain is higher than the access permission level associated with the electronic portable access control device, and if the biometric authentication is successful, permit an access to the access domain; and
permit an access to the access domain without initiating the biometric authentication process if the first access security level associated with the access domain is less than the access permission level associated with the electronic portable access control device; and
a memory configured to store the program;
wherein the electronic portable access control device engages in a communication with the fixed access control device; and
wherein the access permission level comprises a numerical value representing a security clearance level of a plurality of security clearance levels and the first access security level comprises a numerical value representing a security clearance level of the plurality of security clearance levels.

8. The electronic portable access control device of claim 7, wherein the processing module and the memory are part of the smart card.

9. The electronic portable access control device of 7, wherein the data storage device and the memory comprise the same component.

10. The electronic portable access control device of 7, wherein the smart card further comprises a set of contact pads configured to engage with a set of contact pads at the fixed access control device.

11. The electronic portable access control device of claim 7, wherein the electronic portable access control device comprises a transceiver configured to engage in wireless data communication with the fixed access control device.

* * * * *